(12) United States Patent
Sugiyama et al.

(10) Patent No.: US 6,829,404 B2
(45) Date of Patent: Dec. 7, 2004

(54) OPTICAL SWITCH

(75) Inventors: Takanori Sugiyama, Watarai-gun (JP); Yoshihiro Mihara, Matsuzaka (JP); Kazuhiro Nobutoki, Matsuzaka (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/297,913

(22) PCT Filed: Apr. 24, 2002

(86) PCT No.: PCT/JP02/04104

§ 371 (c)(1), (2), (4) Date: Feb. 25, 2003

(87) PCT Pub. No.: WO02/088809

PCT Pub. Date: Nov. 7, 2002

(65) Prior Publication Data

US 2003/0156783 A1 Aug. 21, 2003

(30) Foreign Application Priority Data

Apr. 27, 2001 (JP) ........................................ 2001-133074
Oct. 31, 2001 (JP) ........................................ 2001-335122

(51) Int. Cl.$^7$ .................................................. G02B 6/34
(52) U.S. Cl. ............................ 385/20; 385/15; 385/16; 385/31; 385/36
(58) Field of Search ........................ 385/15, 16, 18–21, 385/31, 33, 36

(56) References Cited

U.S. PATENT DOCUMENTS

| | | | |
|---|---|---|---|
| 4,239,331 A | | 12/1980 | Aoyama |
| 5,594,820 A | | 1/1997 | Garel-Jones et al. |
| 5,642,446 A | * | 6/1997 | Tsai ............................ 385/16 |
| 5,719,972 A | * | 2/1998 | Caron et al. ................. 385/18 |
| 5,999,669 A | | 12/1999 | Pan et al. |
| 6,064,505 A | | 5/2000 | Blanding |

FOREIGN PATENT DOCUMENTS

| | | |
|---|---|---|
| EP | 181657 | 5/1986 |
| EP | 61186920 | 8/1986 |
| JP | 56154701 | 11/1981 |
| JP | 62222215 | 9/1987 |
| JP | 4145409 | 5/1992 |
| WO | 2088809 | 11/2002 |

OTHER PUBLICATIONS

English Language Abstract of JP Appln. No. 04–145409.
English Language Abstract of E.P.O. Appln. No. 61–186920.
English Language Abstract of E.P.O. Appln. No. 62–222215.
English Language Abstract of JP Appln. No. 56–154701.

* cited by examiner

Primary Examiner—Juliana K. Kang
(74) Attorney, Agent, or Firm—Greenblum & Bernstein, P.L.C.

(57) ABSTRACT

An optical switch switches the light path between collimate lenses optically coupled to the ends of corresponding optical fibers by the advancing and retracting movements of a prism. The prism comprises an electromagnetic driver having an armature arranged to hold the prism, a coil block for driving the movement of the armature by use of magnetic actions and a leaf spring. The leaf spring mainly includes four parallelly extending spring strips fixedly joined at one end to a body and at another end to the armature to thus spatially hold the armature and the prism for linear movement. The electromagnetic driver and the prism are disposed next to each other along the moving direction of the armature. The armature and the prism can be linearly moved at a right angle to the light path between the lenses when the optical switch is in action. This allows the prism to be linearly moved, and the device can be minimized in overall size.

14 Claims, 40 Drawing Sheets

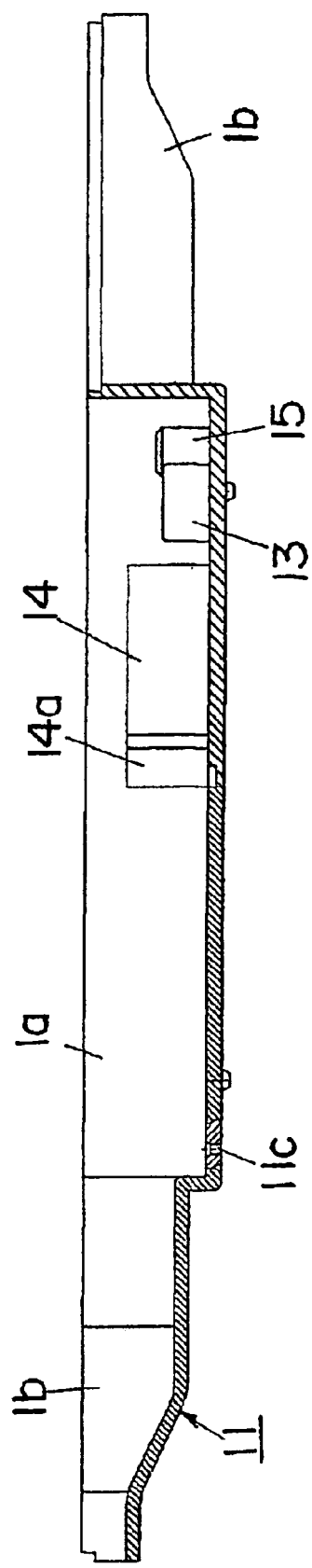
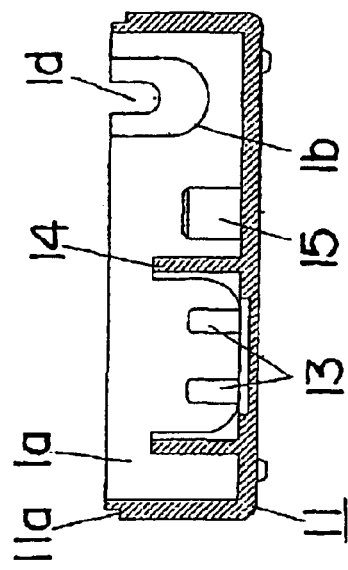
FIG. 6(a)
FIG. 6(b)

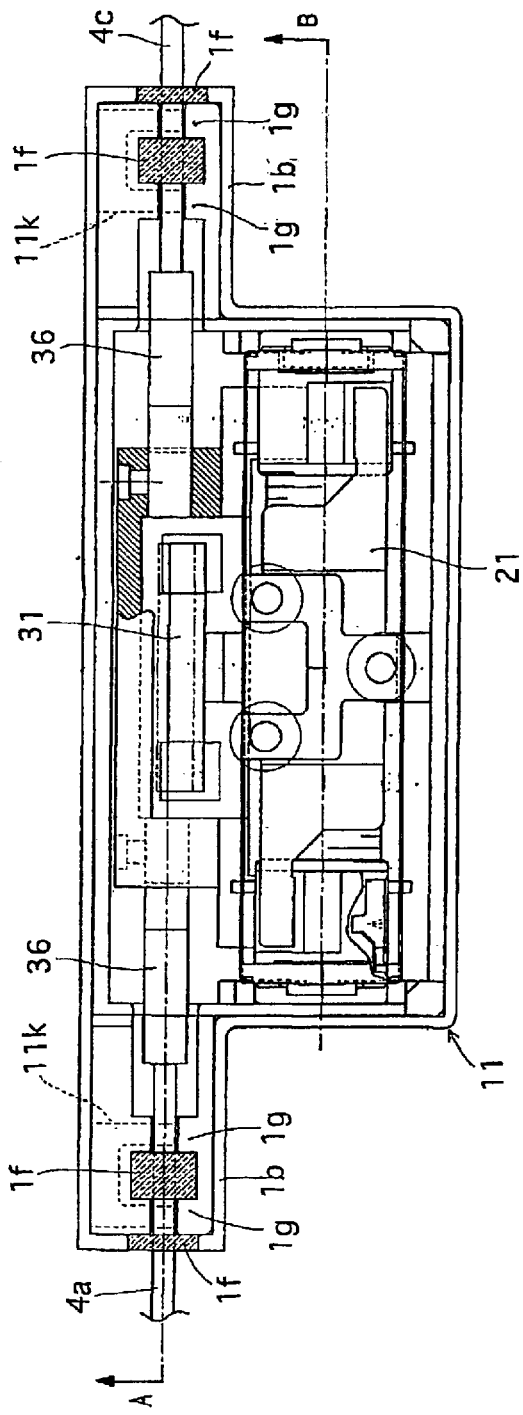
FIG. 54
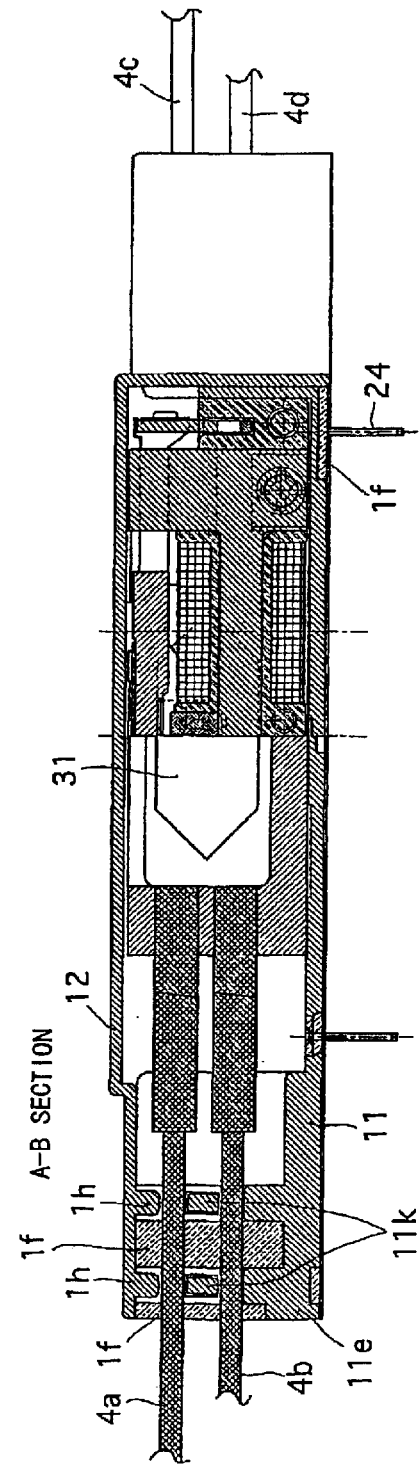
FIG. 55 A-B SECTION

OPTICAL SWITCH

FIELD OF THE INVENTION

The present invention relates to an optical switch for switching a combination of light paths between a plurality of optical fibers.

BACKGROUND OF THE INVENTION

In common, an optical switch is provided for switching the light path between collimate lenses optically coupled to corresponding optical fibers by a prism advancing and retracting between two set of the lenses. Some of such conventional optical switches are disclosed having an electromagnetic driver equipped with an armature which is mechanically joined to the prism (U.S. Pat. No. 5,999,669 and JP Patent Laid-open Publication 4-145409).

The optical switch disclosed in U.S. Pat. No. 5,999,669 has a prism 31 arranged to move to and from between collimate lenses 35, which are optically coupled to corresponding optical fibers 4a to 4c and located at their position in a body 1, for switching the light path, as shown in FIG. 57. The prism 31 is mounted to one end of an arm 37 which is joined at the other end to and driven by a relay RY for rotation. As a result, the prism 31 is moved vertically of the sheet of paper to and from the light path. When the prism 31 is retracted from the light path, the two optical fibers 4a and 4c are coupled. When the prism 31 is set across the light path, the optical fiber 4a is coupled to the optical fiber 4b.

The optical switch disclosed in JP Patent Laid-open Publication 4-145409 has a prism 31 arranged to move to and from between collimate lenses 35, which are optically coupled to corresponding optical fibers 4a, 4b, 4c, and 4d, through the window 38e provided in an iron core for switching the light path, as shown in FIG. 58. The prism 31 is actuated by a mechanism which has a leaf spring 38a joined at one end to a permanent magnet 38b and the prism 31 and at the other end to the iron core 38c. The iron core 38c has a coil 38d wound thereon. When the coil 38d is energized, a magnetic force is developed between the permanent magnet 38b and the iron core 38c thus to move the prism 31 to and from the light path vertically of the sheet of paper. When the prism 31 is retracted from the light path, the optical fibers 4a and 4b are coupled to the optical fibers 4c and 4d respectively. When the prism 31 is present across the light path, the optical fibers 4a and 4d are coupled to each other while the optical fibers 4b and 4c are coupled to each other.

In either the conventional optical switch, the prism 31 is mounted to the arm 37 or the leaf spring 38a which extends at a right angle to the moving direction of the prism 31. Also, as the arm 37 or the leaf spring 38a performs a pivotal movement about one pivot, its length has to be increased for extending the stroke of the movement of the prism 31.

As a result, the body 1 will be increased in the size along the lengthwise direction of the arm 37 or the leaf spring 38a. Also, the body 1 may have an unwanted dead space in the interior thereof. Since the prism 31 is pivotably moved about the pivot on the arm 37 or the leaf spring 38a, its pivotal movement permits the area of the prism 31 adjacent to the center thereof to be off the light path and causes the outermost of the prism 31 to travel a long distance. Accordingly, a more space will be needed for clearing the movement of the prism 31, hence increasing the overall size of the body 1.

SUMMARY OF THE INVENTION

It is hence an object of the present invention to provide an optical switch which is decreased in the overall size with any dead space minimized in its body.

In order to achieve the above-mentioned object, according to the present invention, an optical switch for switching the light path between collimate lenses optically coupled to the ends of corresponding optical fibers by the advancing and retracting movements of a prism, comprises: a body incorporating an optical switch housing; an electromagnetic driver having an armature arranged to hold the prism and a coil block for driving the movement of the armature by means of magnetic actions; and a leaf spring resilient in the moving direction of the armature consisting mainly of at least two parallelly extending spring strips, each of the spring strips is fixedly mounted at one end to the body and at the other end to the armature thus to spatially hold the armature and the prism for linear movement. The electromagnetic driver and the prism are disposed next to each other along the moving direction of the armature, and the armature and the prism can linearly be moved at a right angle to the light path between the lenses when the optical switch is in action.

As one feature of the present invention, the electromagnetic driver allows the armature and thus the prism to move linearly. Also, the electromagnetic driver is located next to the prism along the moving direction of the armature. Accordingly, the size for advancing and retracting the prism is determined simply by the area of the prism projected on a place orthogonal to the moving direction of the armature. As a result, the mechanism for switching the light path can be minimized in the dimensions. Also, as the movement of the prism is linear, unlike the conventional pivotal movement about a pivot point on a member to which the prism is mounted, any dead apace for clearing the movement of the prism will be eliminated. Consequently, the body can be decreased in the overall size.

In the optical switch of the present invention, the coil block in the electromagnetic driver comprises an iron core having two magnetic polar portions provided at both ends thereof, a coil for exciting the iron core, and a permanent magnet for magnetizing the armature, the armature comprises a first contact portion located opposite to one side of one of the two magnetic polar portions which faces one direction of the movement of the armature and a second contact portion located opposite to one side of the other magnetic polar portion which faces the other direction of the movement of the armature, and each of the spring strips is joined to an intermediate region between the two contact portions of the armature. As the electromagnetic driver is of a polar type, it can generate a large driving force from a relatively small level of current thus contributing to the energy saving.

In the optical switch of the present invention, the electromagnetic driver performs a bistable action for holding the armature by the magnetic force of the permanent magnet at each of the two positions, where the first contact portion of the armature comes into direct contact with the corresponding polar portion of the iron core and where the second contact portion of the armature comes into direct contact with the other polar portion of the iron core. As the electromagnetic driver performs the bistable action, its coil has to be energized only when the switching of the light path is required hence minimizing the consumption of power.

In the optical switch of the present invention, the electromagnetic driver performs a monostable action for holding the armature by the magnetic force of the permanent magnet constantly at one of the two positions, where the first contact portion of the armature comes into direct contact with the corresponding polar portion of the iron core or where the second contact portion of the armature comes into direct contact with the other polar portion of the iron core. As the electromagnetic driver performs the monostable action, its coil needs not to be energized while normally connected one of the light path is selected hence minimizing the consumption of power.

In the optical switch of the present invention, the number of the spring strips is four, and the armature is arranged between two pairs of the spring strips, each pair extending in one direction from each joint with the armature to one of the magnetic polar portion. As the armature is supported at both ends along the direction across the two polar portions of the iron core, its movement can substantially be inhibited along a direction which extends at a right angle to the moving direction of the armature and to the direction aligned across the two polar portions. More specifically, when the armature remains at its contact portion in direct contact with the corresponding polar portion of the iron core, its movement are inhibited along the direction at a right angle to the moving direction of the armature and to the direction aligned across the two polar portions hence inhibiting the prism from being dislocated by any external impact. As a result, the possibility of changing the light path or the intensity of light along the light path due to the action of any external stress can successfully be eliminated. As the number of the spring segments is four, those effects can be more emphasized than with two spring segments.

In the optical switch of the present invention, the leaf spring has a joint strip thereof arranged extending in the moving direction of the armature and joined to the armature along the movement in an overlap relationship while the spring strips are arranged integrally with the ends of the joint strip in the moving direction of the armature. Accordingly, the spring segments can be prevented from deflecting during their assembling with the armature. This allows the spring strips to be mounted to the armature with no deflection. Also, as the joint strip of the leaf spring is oriented along the moving direction of the armature, its assembling action can be carried out with ease at the widely open side of the armature.

The optical switch of the present invention allows the prism to be joined to the armature with the use of no particular components and can thus be decreased in the number of components, the overall dimensions, and the production cost. Also, the positional precision of the prism can be ensured by controlling the size of the armature. As a result, the positioning of the prism can be stabilized and improved.

The optical switch of the present invention has the prism holder platform joined integral with the armature while not interrupting the action of the leaf spring.

The optical switch of the present invention has the branches and frame of the leaf spring provided to surround the prism holder platform thus increasing the resistance against any unwanted impact of force along the direction orthogonal to the moving direction of the armature and the lengthwise direction of the spring.

The optical switch of the present invention allows the positional relationship between the armature and the prism to be finely controlled thus minimizing a declination in the intensity of light along the light path between the two sets of the collimate lenses.

The optical switch of the present invention allows the positioning of the components of the electromagnetic driver and the prism in relation to the body to be determined with reference to the iron core, thus minimizing discrepancies between different sample lots.

The optical switch of the present invention has the side wall and the bottom wall of the lens holder platform to be formed integral with each other to develop an L shape in the cross section, hence increasing the physical strength of the lens holder platform even with its side wall and bottom wall arranged thinned. When its strength is desired of a level equal to that of any conventional switch, the lens holder platform can be decreased in the overall size. When its size is desired of a level equal to that of any convention switch, the lens holder platform can spare a more room for the movement of the prism which is thus implemented with much ease.

The optical switch of the present invention has the iron core defining the movement of the armature and the lens holder platform determining the position of the lenses to be joined to each other, thus controlling at high precision the positional relationship between the lenses and the prism. Also, the optical axes of the lenses can accurately be aligned with the prism.

BRIEF DESCRIPTION OF THE DRAWINGS

FIG. 6(a) is a partially cut-off front view of a base of the optical switch and

FIG. 6(b) is a cross sectional view of the same;

FIG. 54 is a plan view of the optical switch with its cover removed off;

FIG. 55 is a cross sectional view taken along the line A–B of FIG. 54;

Figure 1:
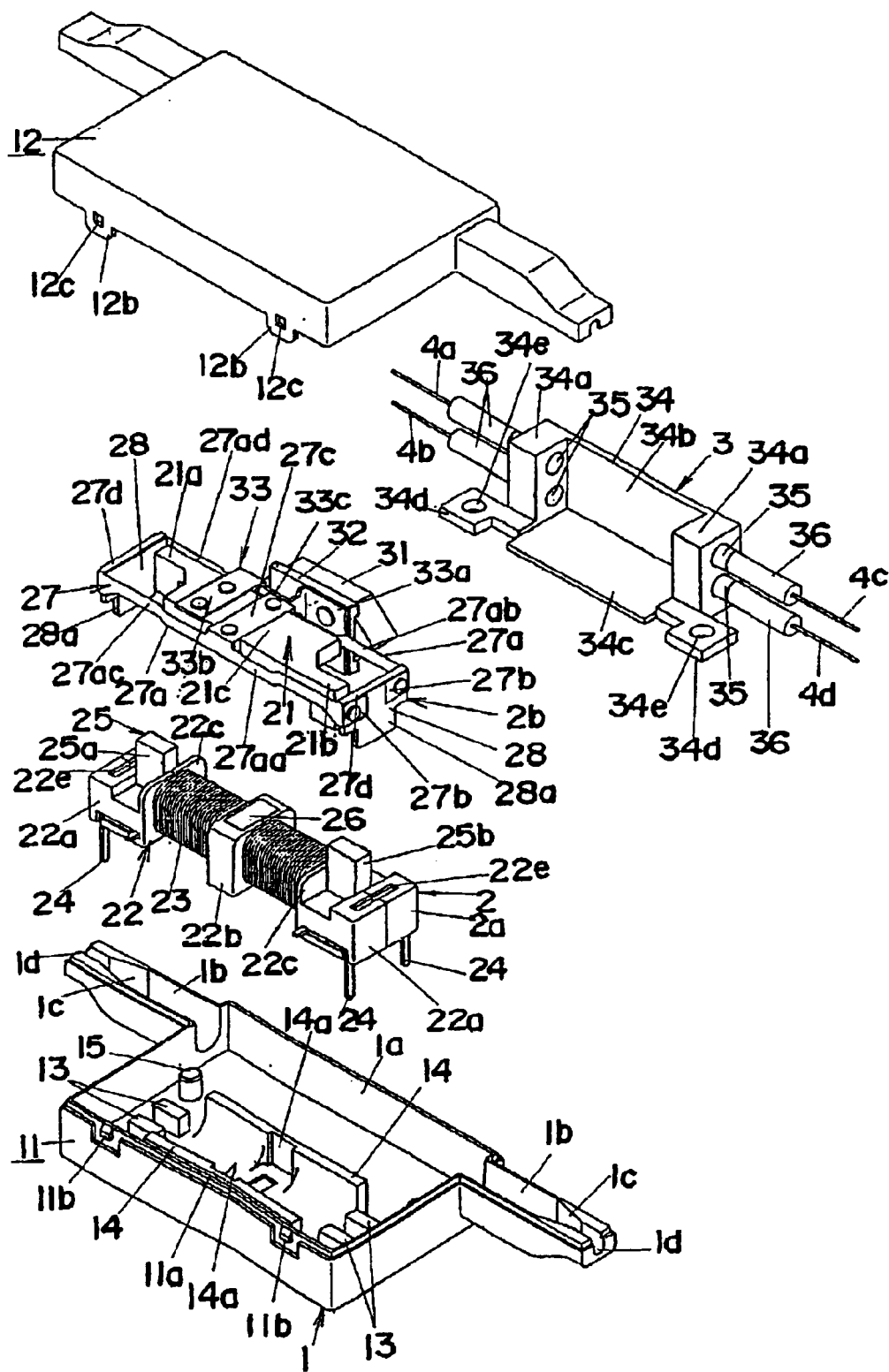
FIG. 1 is an exploded perspective view of an optical switch showing one embodiment of the present invention.

BEST MODES FOR EMBODYING THE INVENTION (First Embodiment)

An optical switch of one embodiment of the present invention will be described referring to FIGS. 1 to 15. The optical switch is of 2×2 type for switching between two modes of optical connection with four optical fibers 4a, 4b, 4c, and 4d; connection between the optical fiber 4a and the optical fiber 4d and between the optical fiber 4b and the optical fiber 4c as shown in FIG. 15(a) and connection between the optical fiber 4a and the optical fiber 4c and between the optical fiber 4b and the optical fiber 4d as shown in FIG. 15(b). The two modes can be selected by the presence and absence action of a prism 31 disposed between one group of the optical fibers 4a and 4b and the other of the optical fibers 4c and 4d. The prism 31 is movable along the vertical direction to the sheet of paper shown in FIG. 15.

Figure 2:
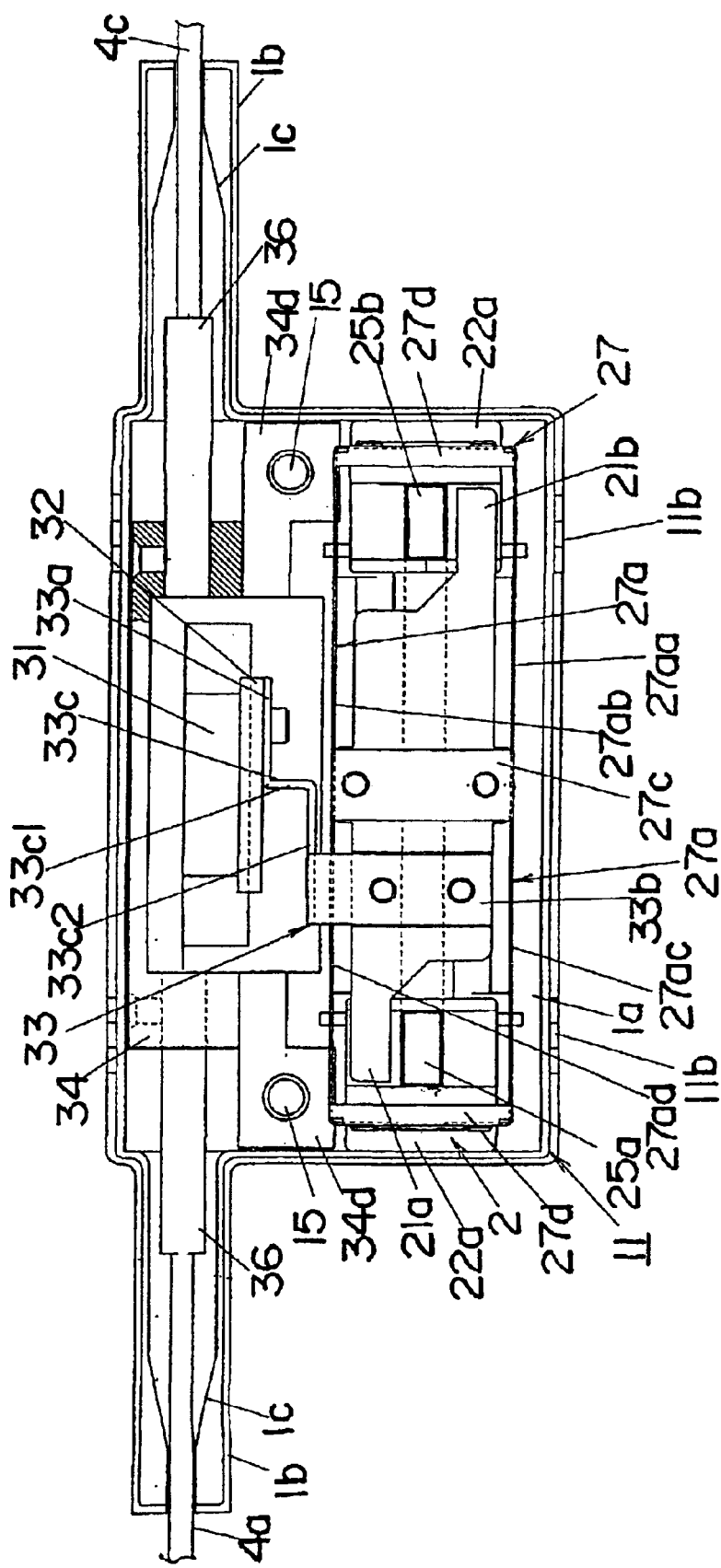
FIG. 2 is a plan view of the optical switch with its cover removed off.
Figure 3:
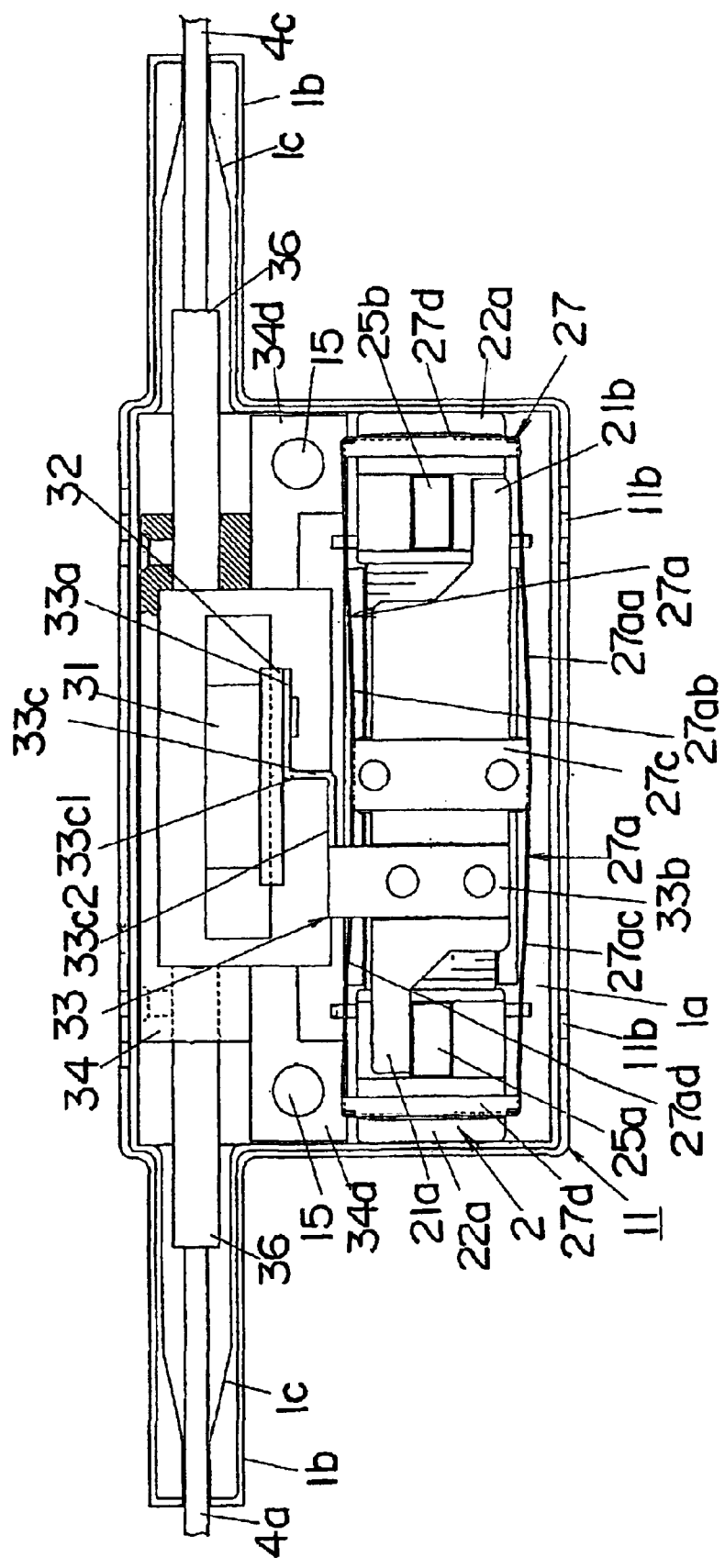
FIG. 3 is a plan view of the optical switch with its prism retracted from the light path.
Figure 4:
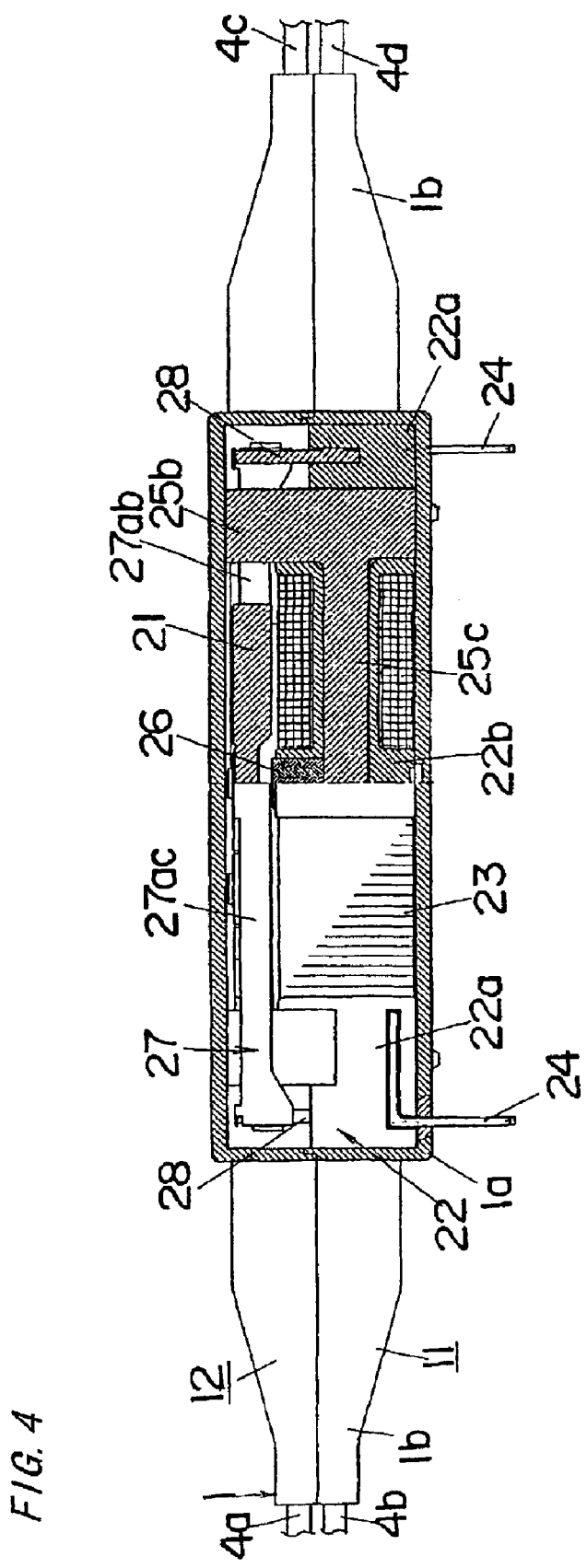
FIG. 4 is a longitudinal cross sectional view of the optical switch.
Figure 5:
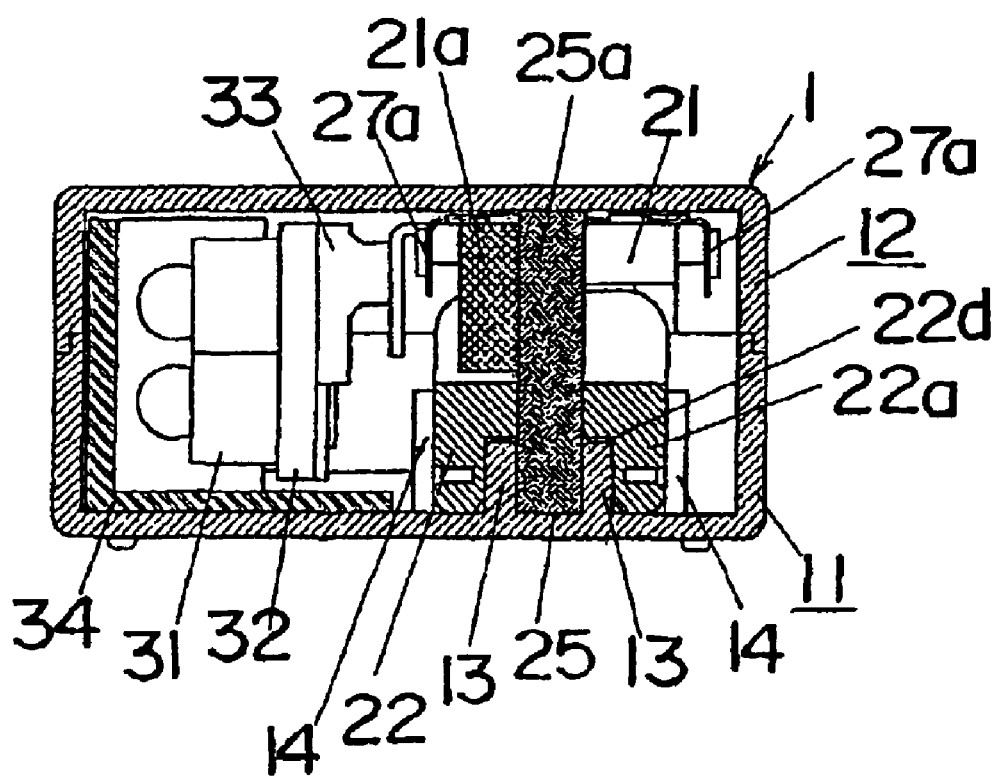
FIG. 5 is a transverse cross sectional view of the optical switch.
Figure 7:
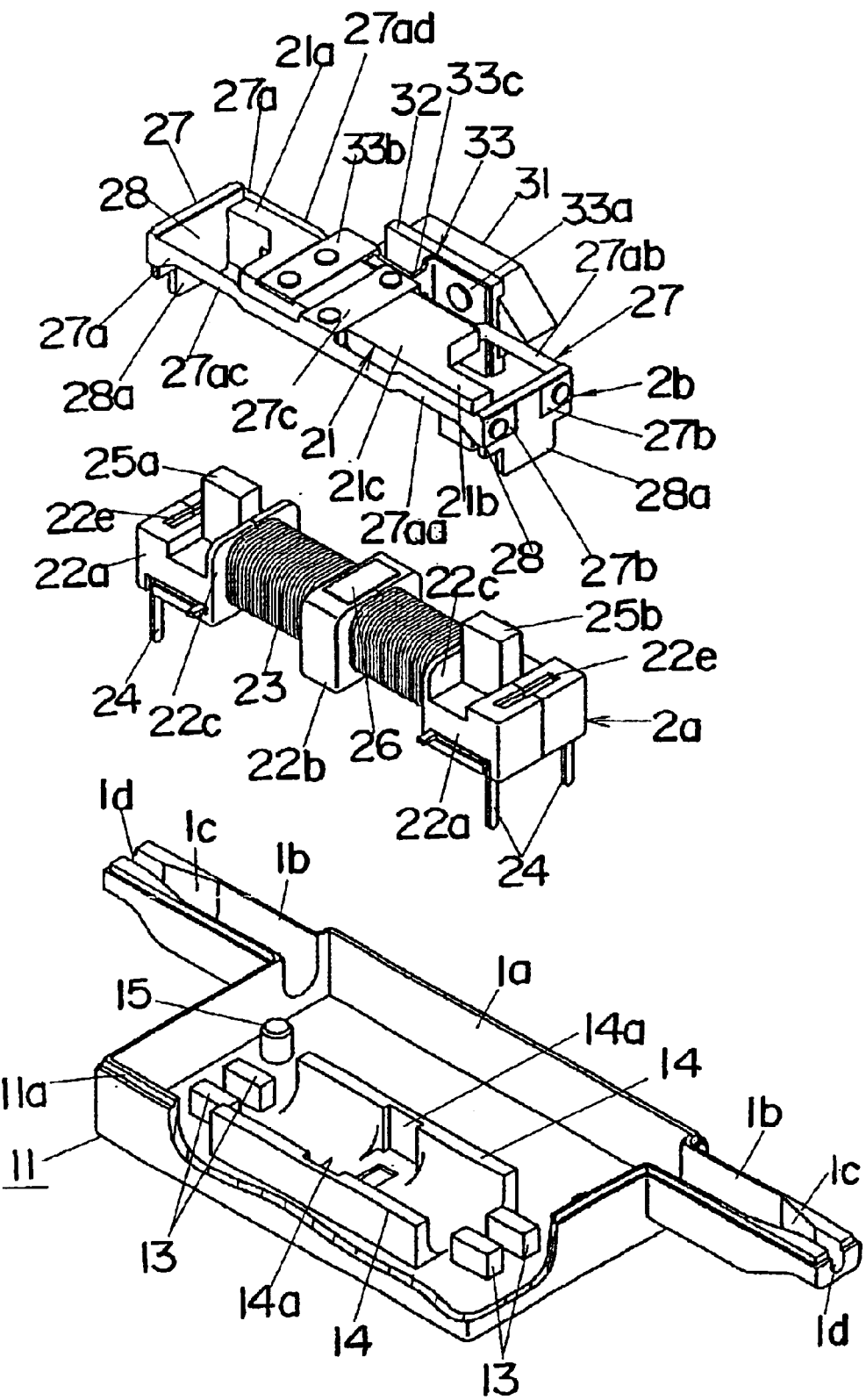
FIG. 7 is a partially cut-off, exploded perspective view of the optical switch.
Figure 8:
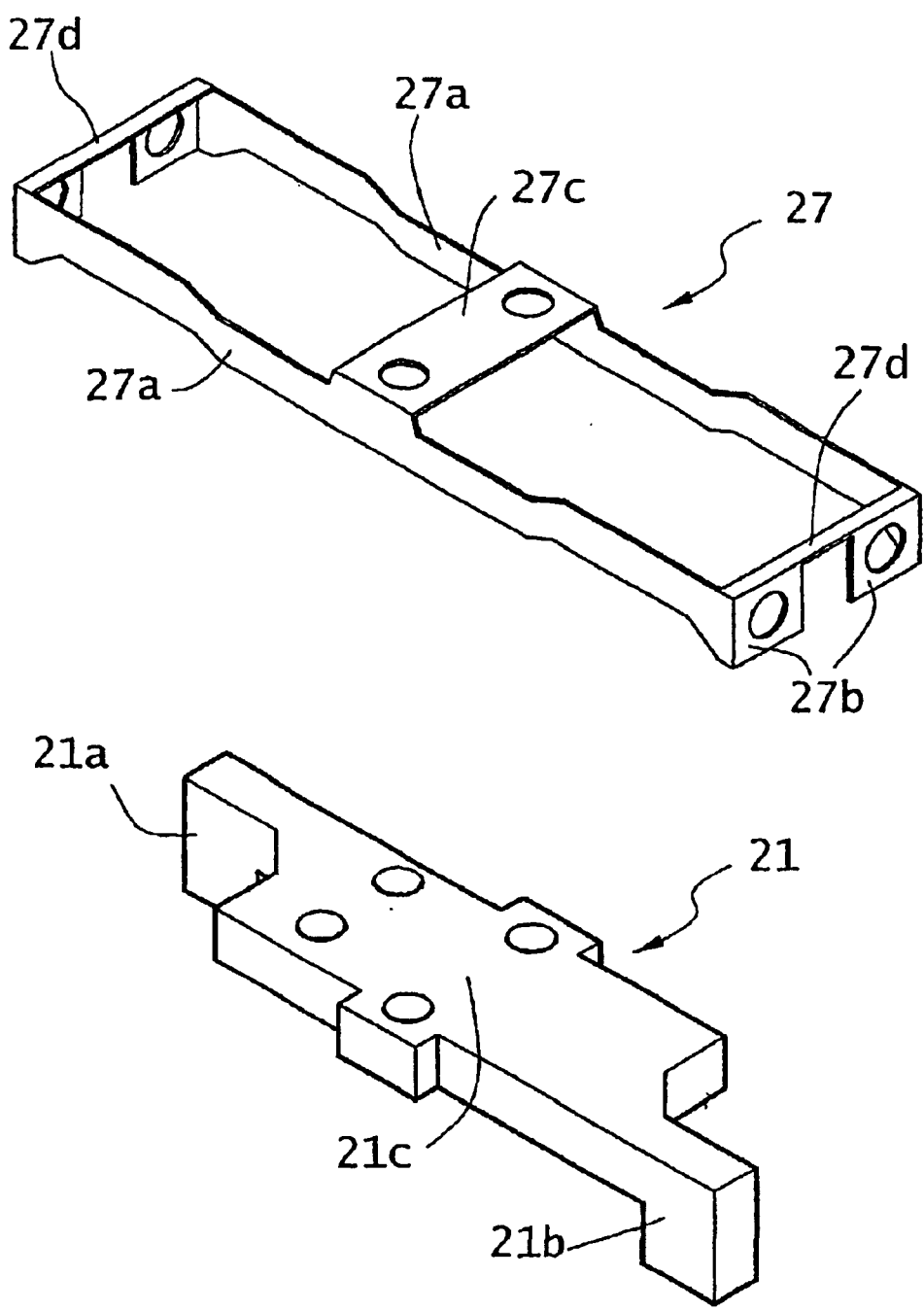
FIG. 8 is a perspective view of a leaf spring and an actuator of the optical switch.

Referring to FIGS. 1 to 3, the optical switch of this embodiment includes an electromagnetic driver 2 with an armature 21 and a light path selector 3 actuated by the action of the armature 21 for switching connection between the two groups of the optical fibers 4a, 4b, 4c, and 4d as described above, both provided in a body 1 made of a synthetic resin molded form. As the armature 21 is displaced, it drives the prism 31 to move to and from between one group of the optical fibers 4a and 4b and the other group of the optical fibers 4c and 4d, thus switching a light path.

The body 1 comprises a base 11 and a cover 12 joined to each other thus having an installation space 1a of a rectangular parallelepiped shape therein. The body 1 also has a couple of tubular conduits 1b provided in both lengthwise ends thereof for communication with the installation space 1a. The installation space 1a and the two conduits 1b are defined between the base 11 and the cover 12 joined to each other. The base 11 has a step 11a thereof provided for abut joining with a step provided in the cover 11. The base 11 also has a plurality of projections 11b provided on the outer surface thereof for engagement with assembling apertures 12c provided in downwardly extending assembling tabs 12b of the cover 12. As their projections and apertures are engaged together, the base 11 and the cover 12 are joined to each other. The electromagnetic driver 2 and the light path selector 3 are installed in the installation space 1a while the four optical fibers 4a, 4b, 4c, and 4d are accepted by the two conduits 1b thus to connect with the light path selector 3.

The electromagnetic driver 2 comprises a coil block 2a equipped with a coil frame 22 of a synthetic resin form and a armature block 2b equipped with the armature 21. The coil frame 22 has a terminal bed 22a provided on each lengthwise end thereof and a magnet holder 22b provided at the lengthwise center thereof. The terminal bed 22a has a flange portion 22c. A coil winding 23 is provided between the flange 22c of each terminal bed 22a and the magnet holder 22b. The coil 23 may be of either single or double winding type as the description is based on its single winding type. The two coils 23, each between the flange 22c and the magnet holder 22b are connected in series to each other. In case of a double winding type, the two coils 23 between the two flanges 22c and the magnet holder 22b are isolated from each other. Two or more terminal pins 24 are provided in each the terminal bed 22a for connection to two ends of each coil 23.

Figure 12:
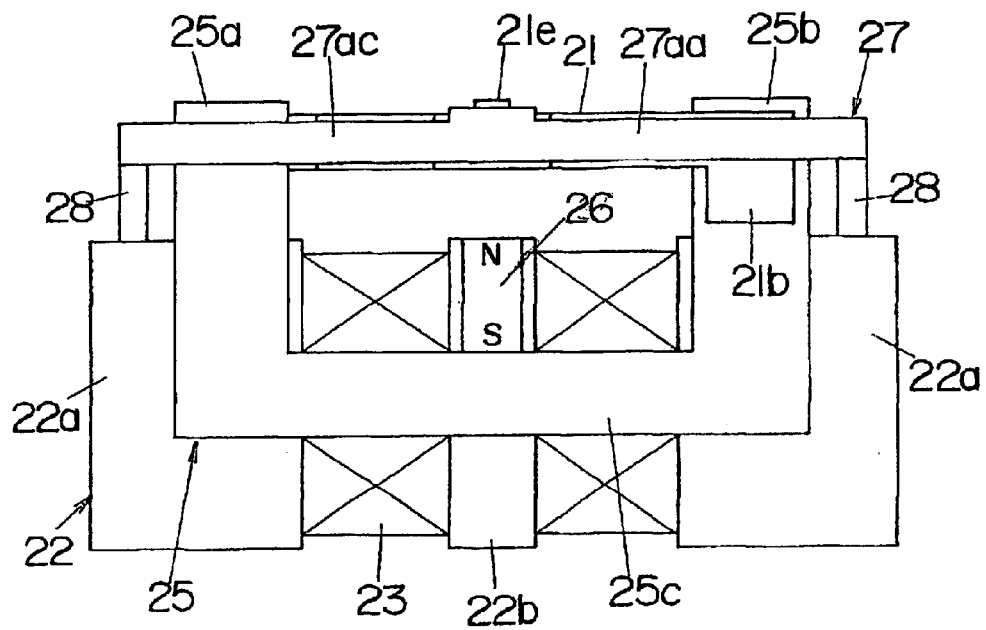
FIG. 12 is a front view of the same.
Figure 13A:
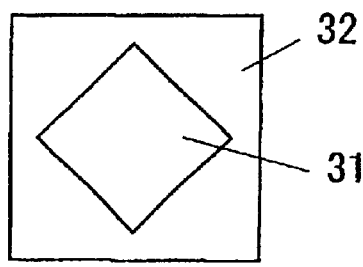
FIGS. 13(a), 13(b), and 13(c) are a front view, a side view, and another side view of a prism mounting plate of the optical switch.
Figure 13B:
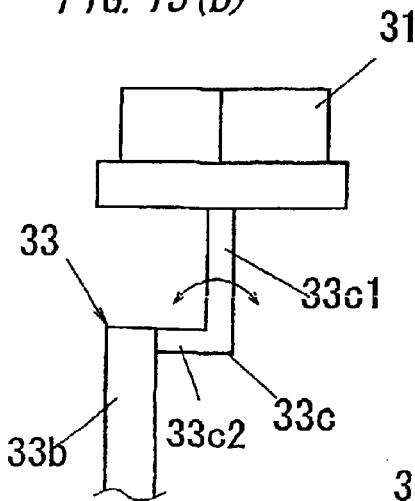
Figure 13C:
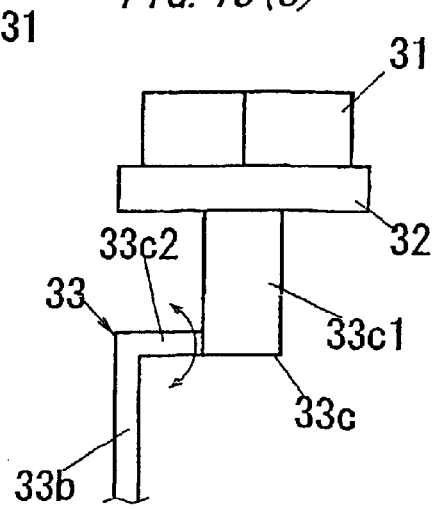

As illustrated in FIGS. 4, 5, 9, and 10, the coil frame 22 holds an iron core 25 which extends from its center 25c (FIG. 9) across the inside of the coil frame 22, on which the coils 23 are wound, to both magnetic polar portions 25a and 25b projected from their respective terminal beds 22a. More specifically, the polar portions 25a and 25b are situated outwardly of the flanges 22c and exposed to the outside from the coils 23. The magnet holder 22b has a permanent magnet 26 embedded therein so that one pole of the permanent magnet 26 is magnetically connected to the center 25c of the iron core 25 while the other pole is projected outward from the magnet holder 22b, as shown in FIG. 12. The magnetic polar portions 25a and 25b are equal in the projecting direction to the two poles of the permanent magnet 26. For allowing the center 25c of the iron core 25 to pass therethrough, the coil frame 22 comprises a pair of pieces which can be separated from each other.

Figures 9A, 9B:
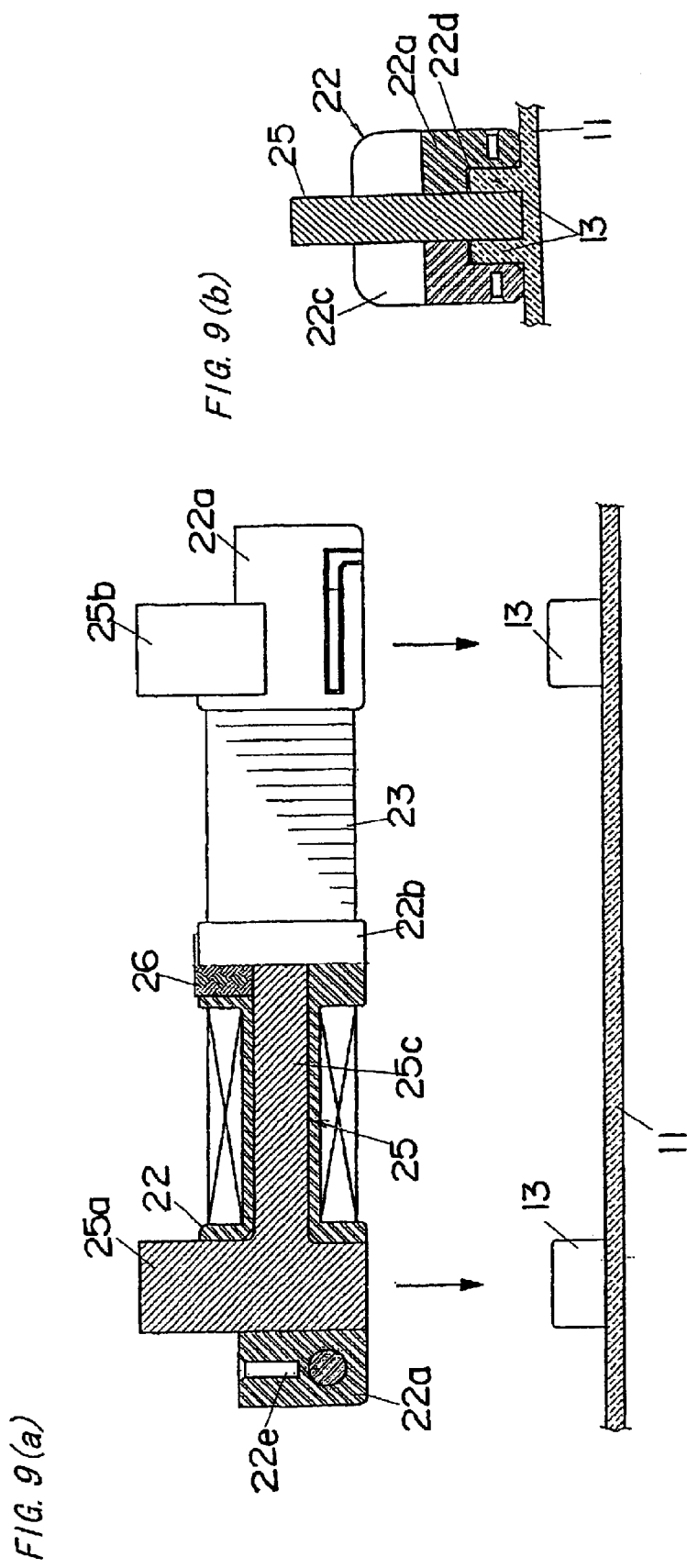
FIG. 9(a) is a partially cut-off exploded front view of an iron core of the optical switch and FIG. 9(b) is a cross sectional view of the same.
Figure 10:
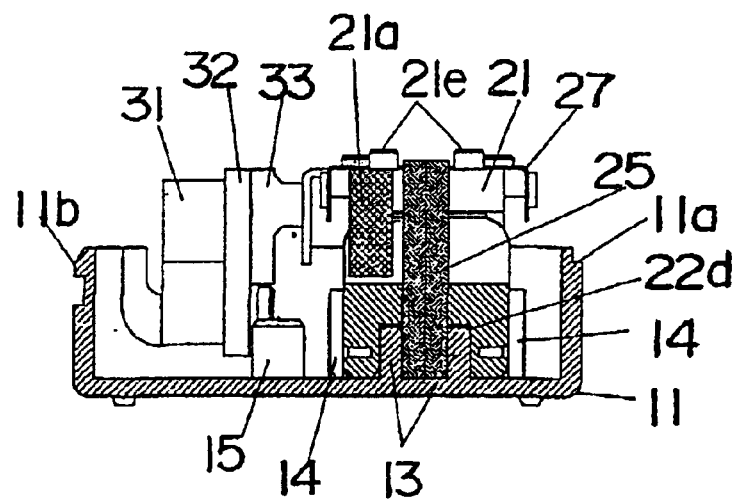
FIG. 10 is a cross sectional view of the optical switch with its cover removed off.

The base 11 has a pair of widthwisely distanced projections 13 provided on each lengthwise end of the inner side in the space 1a thereof on a far side opposite to the side of the conduits 1b for holding the coil block 2a. The terminal bed 22a of the coil block 2a has a pair of recesses 22d provided in each end of the bottom thereof (terminal pins 24 projecting side) for engagement with the paired projections 13, as shown in FIGS. 9(b) and 10. The iron core 25 extends into each of the recesses 22d. When its iron core 25 is pressed down at one side to fit between the paired projections 13, the coil block 2a is fixedly joined to the base 11 with its recesses 22d accepting the projections 13 as shown in FIGS. 9(a) and 9(b). This inhibits the iron core 25 from being dislocated from its position on the base 11. Also, the base 11 has a pair of holding walls 14 provided on the inner side at the space 1a thereof for holding the magnet holder 22b of the coil block 2a which is fitted by pressing into two engaging slots 14a provided in the two walls 14 respectively. Accordingly, the coil block 2a is securely held at the lengthwise center in the base 11. When the coil block 2a is mounted to the base 11, its terminal pins 24 extend through corresponding terminal holes 11c (See FIG. 6(a)) provided in the base 11 to the outside of the base 11.

The armature 21 has two contact portions 21a and 21b provided on both ends of a square main body 21c thereof for moving directly to and from the two magnetic polar portions 25a and 25b of the iron core 25 respectively. The two contact portions 21a and 21b extend outwardly from two diagonally opposite sides at the lengthwise ends of the main body 21c so that the two contact portions 21a and 21b are positioned to face the two magnetic polar portions 25a and 25b of the iron core 25 respectively. In particular, the contact portion 21a faces the polar portion 25a at one side while the contact portion 21b faces the polar portion 25b at the other side.

The armature 21 is joined to a pair of retaining sheets 28 by a balancing spring 27 having a leaf spring function. The paired retaining sheets 28 are anchored to the two terminal beds 22a of the coil block 2a respectively. The balancing spring 27 made of a single metal spring material comprises a pair of spring strips 27a extending lengthwisely along both sides of the armature 21, mounting strips 27b provided by bending into an L shape both ends of each spring strip 27a, and a joint strip 27c joining at the lengthwise center between the two spring strips 27a. More specifically, the joint strip 27c is joined at each end thereof along the movement of the armature 21 to the spring strip 27a. Also, the balancing spring 27 has a bridge strip 27d provided orthogonal to the mounting strips 27b at each end thereof for jointing at the lengthwise ends of the paired spring strips 27a. This inhibits the spring strips 27a from being biased outwardly when the balancing spring 27 remains not joined to any other component.

The joint strip 27c is placed over and joined at two locations by caulking to the lengthwise center of the armature 21. More specifically, the joint strip 27c is accepted by two pegs 21e (FIG. 12) of the armature 21 which are then flattened for locking. Accordingly, when the balancing spring 27 is joined with the armature 21, its spring strips 27a are held free from any external stress and can thus remain not deformed. Also, as the armature 21 has the pegs 21e provided on one side thereof, its shape can be simple. Since the armature 21 is secured at its top side to the balancing spring 27, it provides a comparatively wider space there about hence contributing to the ease of an assembling process. The mounting strips 27b between the two spring strips 27a are joined also by caulking to the paired retaining sheets 28 which are in turn joined with their engaging projections 28a inserted into corresponding holding holes 22e of the terminal beds 22a. As a result, the retaining sheets 28 are securely anchored to the coil frame 22. The spring strip 27a consists mainly of two pieces which stay resilient independently at both sides of the joint strip 27c. The armature 21 is hence supported by a pair of spring segments 27aa and 27ab between one of the paired retaining sheets 28 and the joint strip 27c at one end and by another pair of spring segments 27ac and 27ad between the other retaining sheet 28 and the joint strip 27c at the other end. In all, the armature 21 is supported by four of the spring segments 27aa to 27ad.

Figure 11:
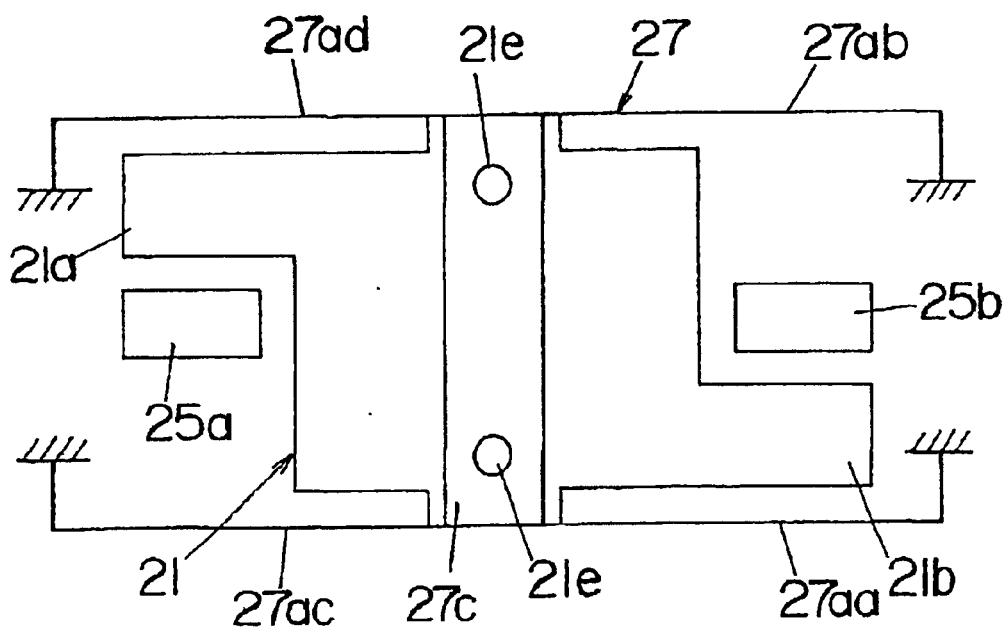
FIG. 11 is a plan view showing a functional arrangement of an electromagnetic driver of the optical switch.

The action of the optical switch will now be explained referring to FIGS. 11 and 12. The armature 21 has its center located adjacent to N pole of the permanent magnet 26 and is hence magnetized to have an N pole. When the coil 23 is energized, the polar portion 25a at the left end of the iron core 25 is turned to an S pole and then attracts the contact portion 21a of the armature 21. Simultaneously, a repulsive force is developed between the polar portion 25b and the contact portion 21b of the armature 21 to move the armature 21 downwardly of FIG. 11. Accordingly, when the coil 23 is deenergized, the armature 21 is held at its lower position by the magnetic force of the permanent magnet 26. This state is illustrated in FIG. 3. When the coil 23 is energized in an opposite direction, the polar portion 25b at the right end of the iron core 25 is turned to the S pole. Accordingly, while the contact portion 21a and the polar portion 25a repel each other, the contact portion 21b is attracted by the polar portion 25b to move the armature 21 upwardly of FIG. 11. When the coil 23 is deenergized, the armature 21 is held at its upper position by the magnetic force of the permanent magnet 26. More specifically, the electromagnetic driver 2 of this embodiment is of a polar type with the permanent magnet 26 thus ensuring bistable actions. By controllably energizing the coil 23, the armature 21 can be moved in parallel upwardly and downwardly of FIG. 11.

Figure 16A:
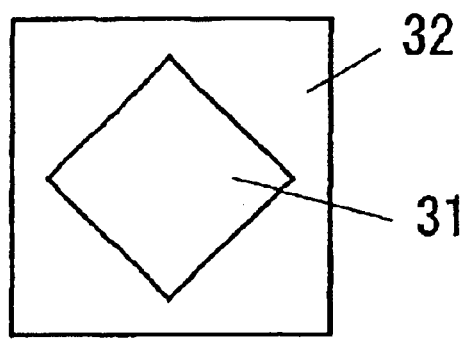
FIGS. 16(a), 16(b), and 16(c) are a front view, a side view, and another side view of a modification of the prism mounting plate of the optical switch.
Figure 16B:
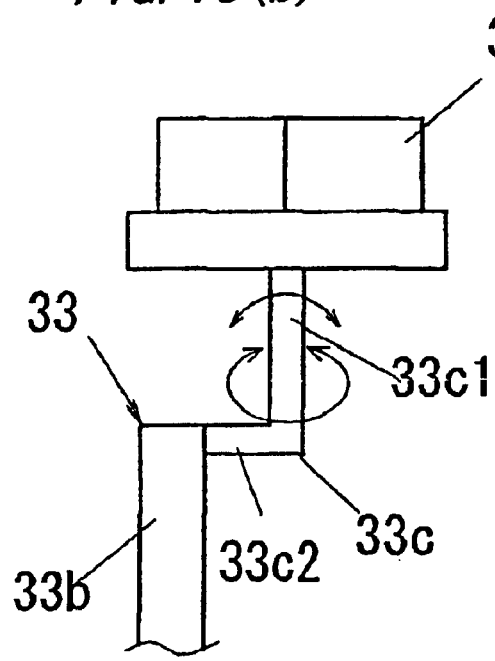
Figure 16C:
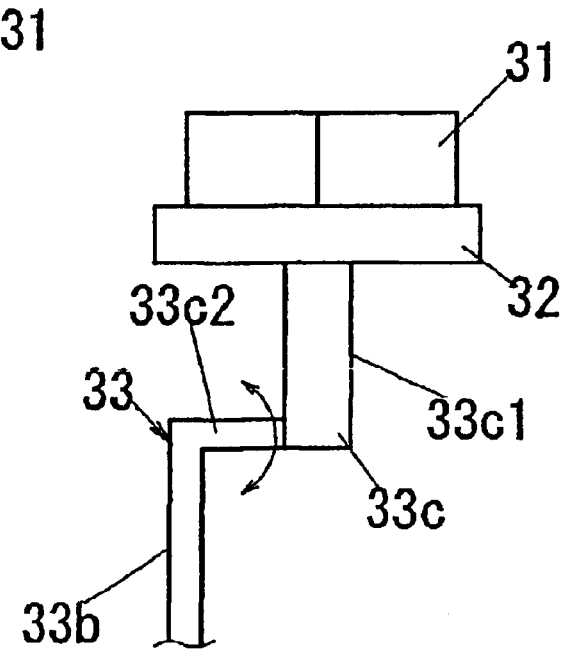
Figure 17A:
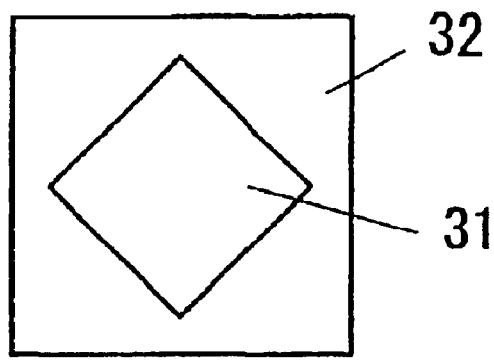
FIGS. 17(a), 17(b), and 17(c) are a front view, a side view, and another side view of another modification of the prism mounting plate of the optical switch.
Figure 17B:
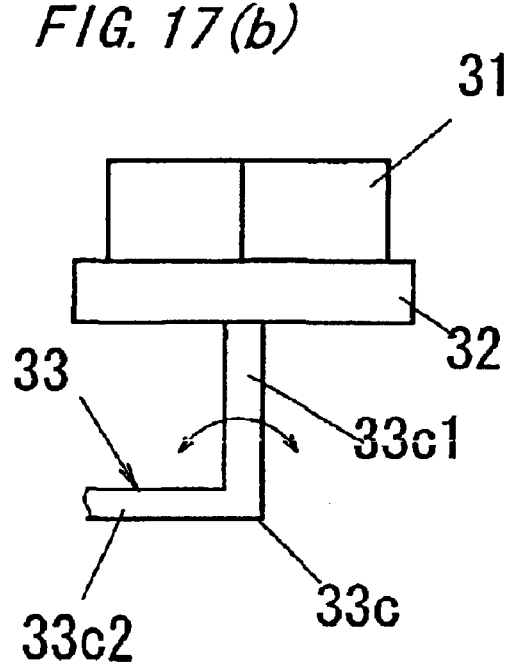
Figure 17C:
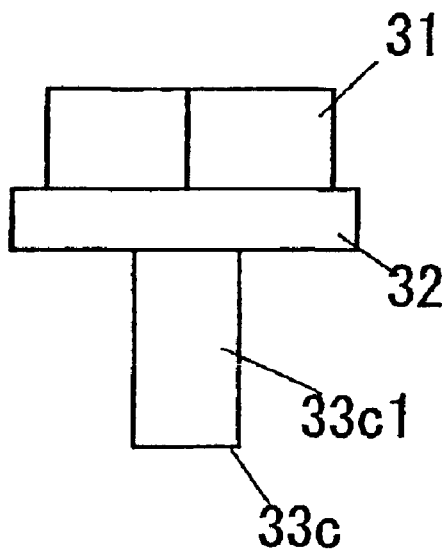
Figure 18:
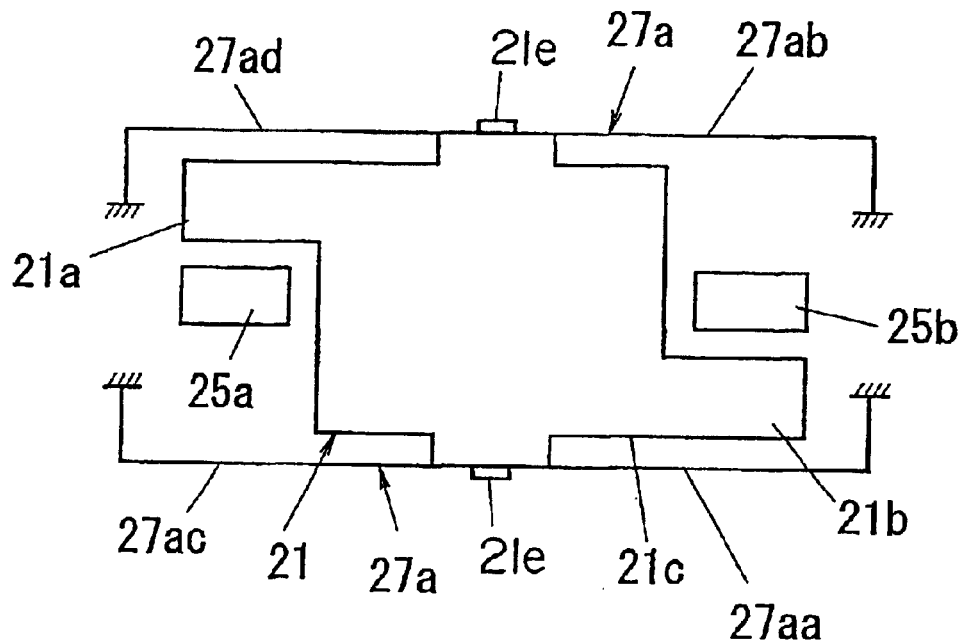
FIG. 18 is a plan view of a functional arrangement of a modification of the electromagnetic driver.
Figure 19:
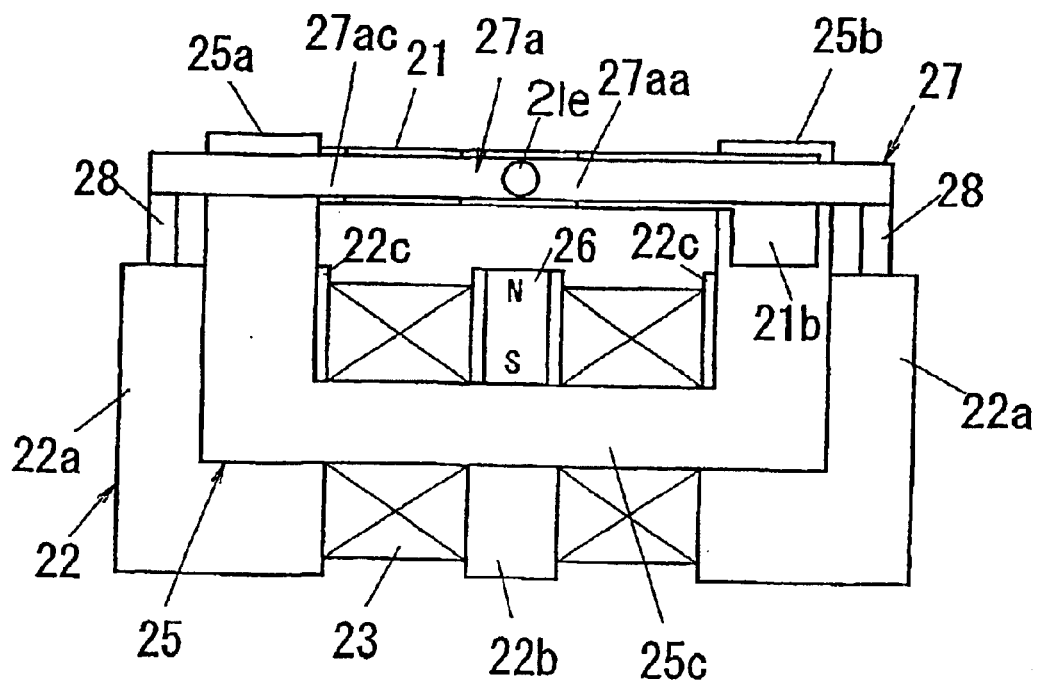
FIG. 19 is a front view of the same.

As described previously, the light path selector 3 is adapted for switching the light path between the two groups of the optical fibers 4a, 4b, 4c, and 4d with and without the use of the prism 31 which is joined to the armature 21. The prism 31 is bonded by an adhesive to a holder plate 32 made of a metal such as aluminum. The holder plate 32 is joined to the armature 21 by an adjuster plate 33 which is made of a sheet of metal. More particularly, the prism 31 is mechanically joined to the armature 21 by a prism mounting combination of the holder plate 32 and the adjuster plate 33. The holder plate 32 is arranged orthogonal to the moving direction of the armature 21. The adjuster plate 33 comprises a mounting portion 33a joined by two-point caulking in overlap relationship to the holder plate 32, a supporting portion 33b joined by two-point caulking to one side of the armature 21 in parallel to the joint portion 27c, and an adjusting portion 33c joining between the mounting portion 33a and the supporting portion 33b. The adjusting portion 33c is arranged of substantially an L shape having a second half 33c2 extending along the side of the armature 21 and a first half 33c1 4 extending from the side of the armature 21 to the holder plate 32. The angle between the two halves 33c4 and, 33c2 is set to a desired degree to determine the position of the prism 31 relative to the armature 21. The adjusting portion 33c is bent in a thicknesswise direction of the metal plate. Also, the joint between the adjusting portion 33c and the supporting portion 33b is adjustable in the angle. This can also determine the position of the prism 31 through controlling the angle. The position of the prism 31 relative to the armature 21 can controllably be determined in two directions denoted by the arrows in FIG. 13. It is also possible, as shown in FIG. 16, to control the position of the prism 31 in three directions denoted by the arrows by a modification of the first half 33c1 which is narrowed in the width and thus twisted in any desired direction. Alternatively, when the angle between the supporting portion 33b and the adjusting portion 33c is fixed but not variable, the position of the prism 31 can be controlled only in one particular direction denoted by the arrow in FIG. 17.

Figure 14:
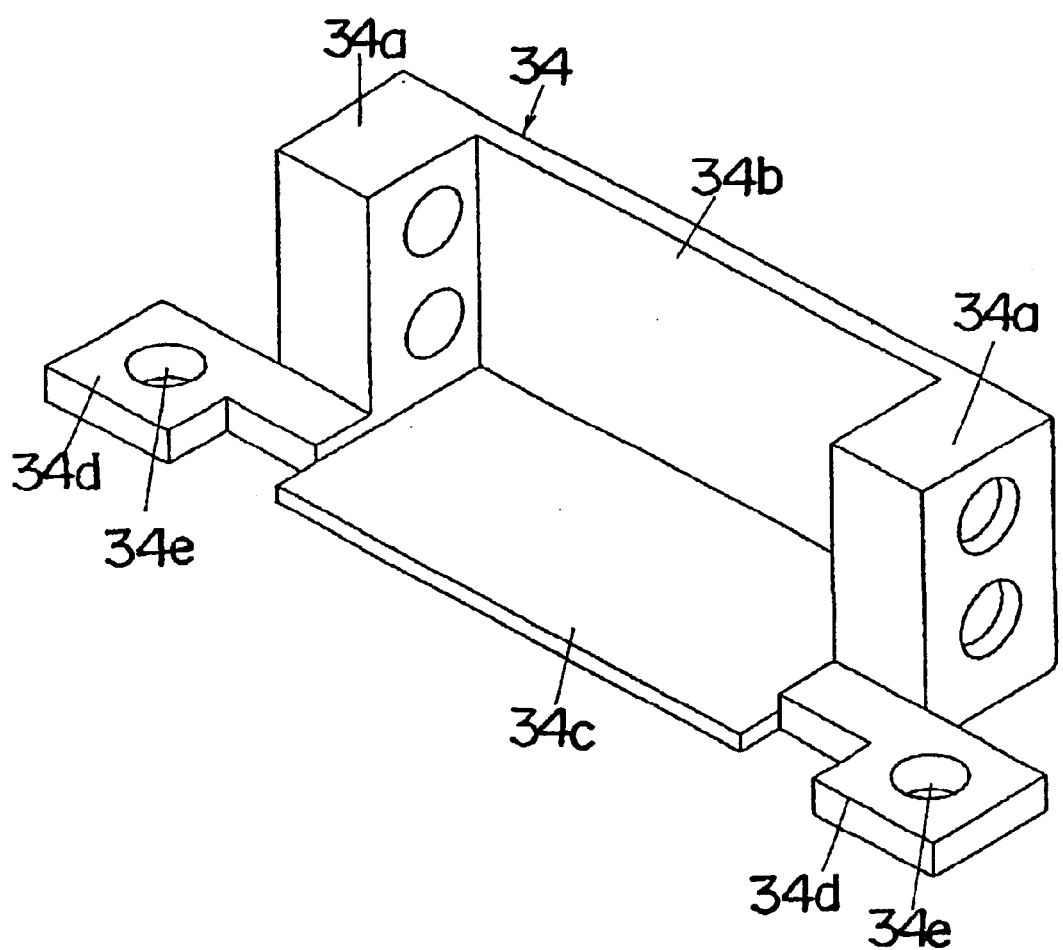
FIG. 14 is a perspective view of a lens holder platform of the optical switch.
Figure 15A:
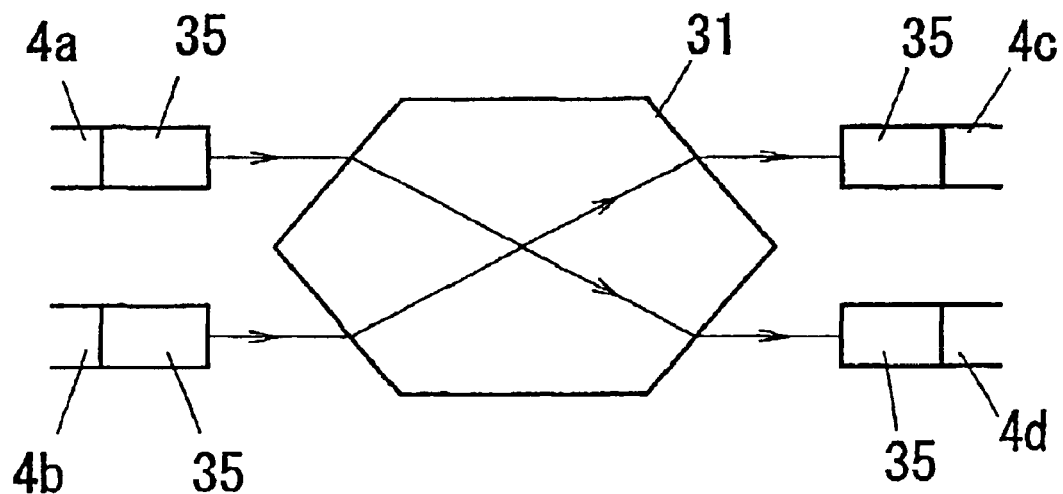
FIGS. 15(a) and 15(b) are plan views explaining actions of the optical switch.
Figure 15B:
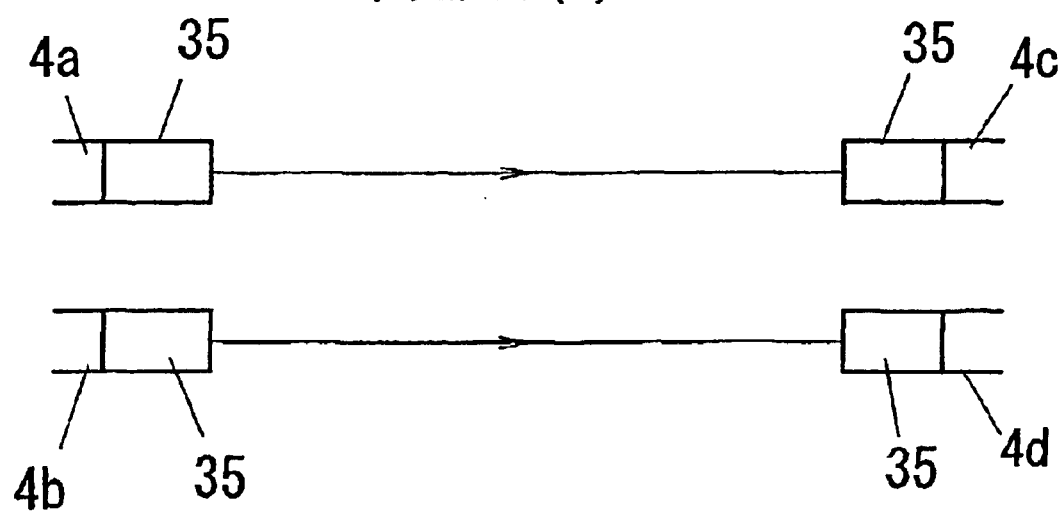

The light path selector 3 includes a lens holder platform 34 made of e.g. sintered alloy for holding the incoming ends of the optical fibers 4a, 4b, 4c, and 4d, as shown in FIG. 14. The lens holder platform 34 comprises a pair of lens supports 34a of a rectangular parallelepiped shape, each supporting two (collimate) lenses 35 (See FIG. 1). The two lens supports 34a are positioned so that any two opposite lenses 35 face each other. The two lens supports 34a are joined to each other by a side wall 34b at one side and a bottom wall 34c at the bottom. Each of the lens supports 34a is joined on the other side at the lower end to a mounting tab 34d which has a mounting hole 34e provided therein. The side wall 34b and the bottom wall 34c are joined to each other thus forming an L shape in the cross section. This allows the lens holder platform 34 having relatively small dimensions to be increased in the physical strength regardless thus inhibiting the two lens supports 34a from being dislocated from each other by any external stress. Also, as the lens holder platform 34 is rigid enough regardless of thinning of the side wall 34b and the bottom wall 34c, it can save the space wide for accepting the prism 31 between its lens supports 34a, hence guaranteeing the movement of the prism 31.

The base 11 has a pair of upward bosses 15 provided on the inner side at the widthwise center of the installation space 1a thereof as spaced from each other along the lengthwise direction of the installation space 1a. The lens holder platform 34 is fixedly joined to the base 11, when its mounting holes 34e receive the two upward bosses 15 respectively which are then heated and flattened at the distal end (for thermal caulking).

Each of the incoming ends of the four optical fibers 4a, 4b, 4c, and 4d is coupled to a pigtail 36 of a cylindrical shape. When the lenses 35 are bonded to sides of the pigtails 36, they are optically coupled with the optical fibers 4a, 4b, 4c, and 4d. The bonding between the lenses 35 and the pigtails 36 are by a UV adhesive which is cured when exposed to ultraviolet ray. As any two opposite lenses 35 on their, respective lens supports 34a face each other, light can pass between one group of the optical fibers 4a and 4b and the other group of the optical fibers 4c and 4d. The lenses 35 of collimate type are located to pass lights in parallel between the two lens supports 34a. The distance between the two mounting tabs 34d is substantially equal to the length of the installation space 1a of the base 11 so that the lens holder platform 34 can precisely be positioned on the base 11. The four optical fibers 4a, 4b, 4c, and 4d with their corresponding pigtails 36 mounted on the lens holder platform 34 are accommodated in the incoming conduit 1b between the base 11 and the cover 12. The incoming conduit 1b includes a taper portion 1c which becomes narrower towards the other end opposite to the installation space 1a end and a lead slot 1d provided at the distal thereof end and sized substantially equal in the diameter to the optical fibers 4a, 4b, 4c, and 4d.

As described, the prism 31 is joined to the armature 21, it can travel with the armature 21 controlled by energization of the coil 23 in the electromagnetic driver 2. More particularly, the prism 31 can be moved between its advanced position between the two lens supports 34a in the lens holder platform 34 and its retracted position spaced from the lens holder platform 34. By the movement of the prism 31, the light path is switched from one of the two modes for coupling between the optical fibers 4a and 4c and between the optical fibers 4b and 4d to the other for coupling between the optical fibers 4a and 4d and between the optical fibers 4b and 4c or vice versa. Also, the orientation of the prism 31 in relation to the optical axes of the lenses 35 can be determined by controlling the adjuster plate 33 thus to avoid declination of the light transmission efficiency between one group of the optical fibers 4a and 4b and the other group of the optical fibers 4c and 4d.

As described, the electromagnetic driver 2 of this embodiment is of polar type with the permanent magnet 26 provided across the magnetic path for providing bistable actions. This allows the light path between one group of the optical fibers 4a and 4b and the other group of the optical fibers 4c and 4d to be switched from one mode to the other mode by energizing the coil 23 in the electromagnetic driver 2 and remain at its mode when the coil 23 is deenergized. Accordingly, this action will be a highly energy saving action as compared with a conventional continuously energizing action. Also, the armature 21 is supported by the four spring segments 27aa to 27ad of the balancing spring 27 which can be biased along the moving direction of the armature 21. Even if the armature 21 receives any external force of impact, its displacement can be inhibited by the action of the spring segments 27aa to 27ad thus reducing unwanted change of the light transmission condition between one group of the optical fibers 4a and 4b and the other group of the optical fibers 4c and 4d.

Moreover, since the armature 21 is movable in parallel and the light path selector 3 is located at one side of the electromagnetic driver 2, the thickness of the body 1 can be as small as the height of the electromagnetic driver 2 hence minimizing the height of the body 1 when the terminal pins 24 extending from the bottom of the body 1. The parallel movement of the armature 21 also permits the distance between the two lens supports 34a to be as small as the width of the prism 31, thus contributing to the smaller size of the lens holder platform 34. The electromagnetic driver 2 and the light path selector 3 are located side by side while the space for the movement of the prism 31 only is maintained. As a result, the body 1 has no dead space and can thus be minimized in the overall dimensions.

For assembling the optical switch of the embodiment, the procedure starts with mounting the coil block 2a of the electromagnetic driver 2 and then the lens holder platform 34 on the base 11. Then, the coil block 2a is joined with the armature block 2b and the base 11 is covered with the cover 12. This allows the different components to be mounted to the base 11 from one direction thus enabling an automatic mode of the assembling process. When the coil block 2a is mounted on the base 11, its iron core 25 is pressed into between the paired projections 13 until the recesses 22d provided in its terminal bed 22a accept their corresponding projections 13. This allows the coil block 2a to be precisely positioned on the base 11. The armature block 2b has the balancing spring 27 caulked at two locations to the armature 21 and to the two retaining sheets 28 and the adjuster plate 33 caulked at two locations to the armature 21 and to the holder plate 32. Accordingly, the holder plate 32 (with the prism 31), the adjuster plate 33, the armature 21, the balancing spring 27, and the retaining sheets 28 are joined together while positioned correctly. As the engaging projections 28a of the retaining sheets 28 are pressed into the corresponding holding holes 22e of the coil block 2a, the position of the armature block 2b on the base 11 is determined by the installation of the iron core 25. As a result, the other components can correctly be installed at their positions with reference to the location of the iron core 25, hence minimizing a difference in the properties between sample lots.

Although the balancing spring 27 is joined to the armature 21 at its joint strip 27c between the two spring strips 27a in this embodiment, it may have its spring strips 27a joined at the lengthwise center by two pegs 21e to both sides of the armature 21.

(Second Embodiment)

Figure 20:
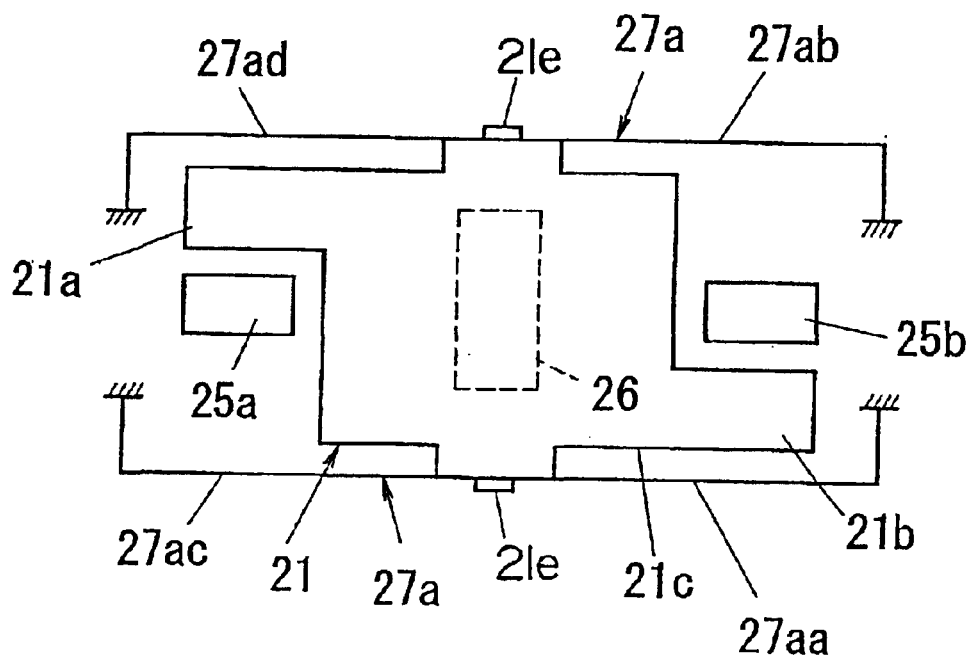
FIG. 20 is a plan view of a functional arrangement of an electromagnetic driver of an optical switch showing a second embodiment, of the present invention.
Figure 21:
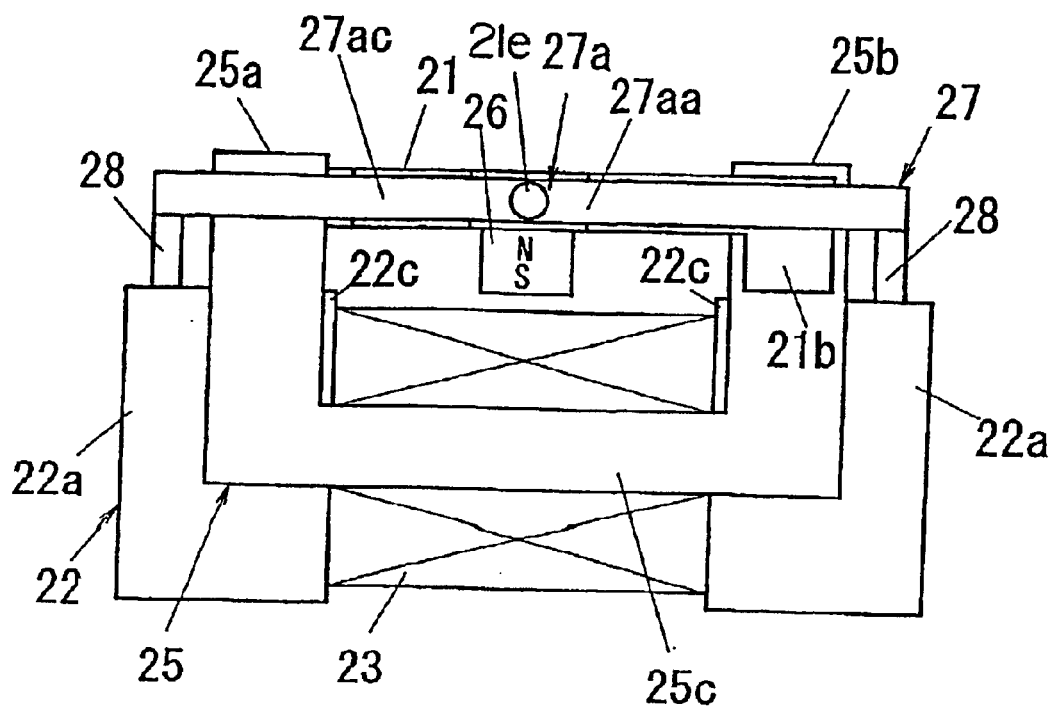
FIG. 21 is a front view of the same.

While the permanent magnet 26 is mounted to the coil frame 22 in the first embodiment, it is mounted to the lengthwise center of the armature 21 to face the electromagnetic block 2a in the second embodiment as shown in FIGS. 20 and 21. The permanent magnet 26 is magnetically coupled at one pole to the armature 21 for magnetization. The other components are identical to those of the first embodiment. The action of the electromagnetic driver 2 hence remains unchanged like as the first embodiment. As the coil frame 22 of this embodiment needs not to include a magnet holder 22b, it can spare more room for the coil 23 in its given size not different from that of the first embodiment thus lowering the power consumption. If the room for the coil 23 remains equal to that of the first embodiment, the coil frame 22 can be reduced in the dimensions thus allowing the body 1 to be minimized in the overall size.

(Third Embodiment)

Figure 22:
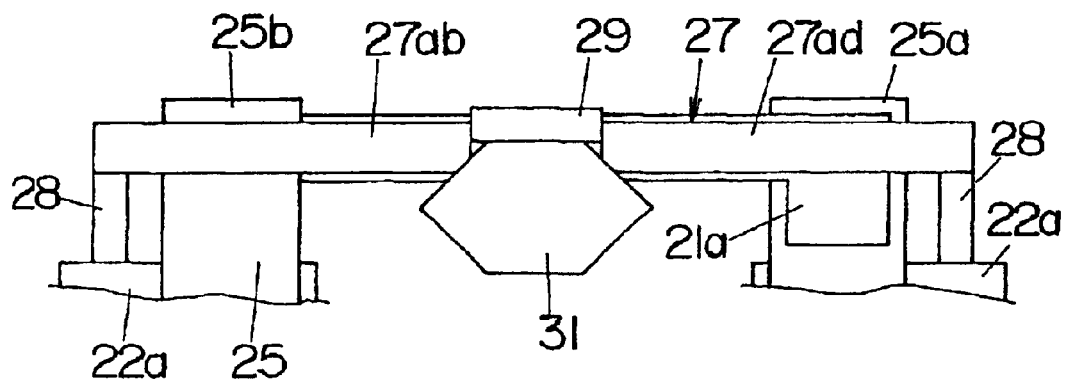
FIG. 22 is a primary back view of an electromagnetic driver of an optical switch showing a third embodiment of the present invention.
Figure 23:
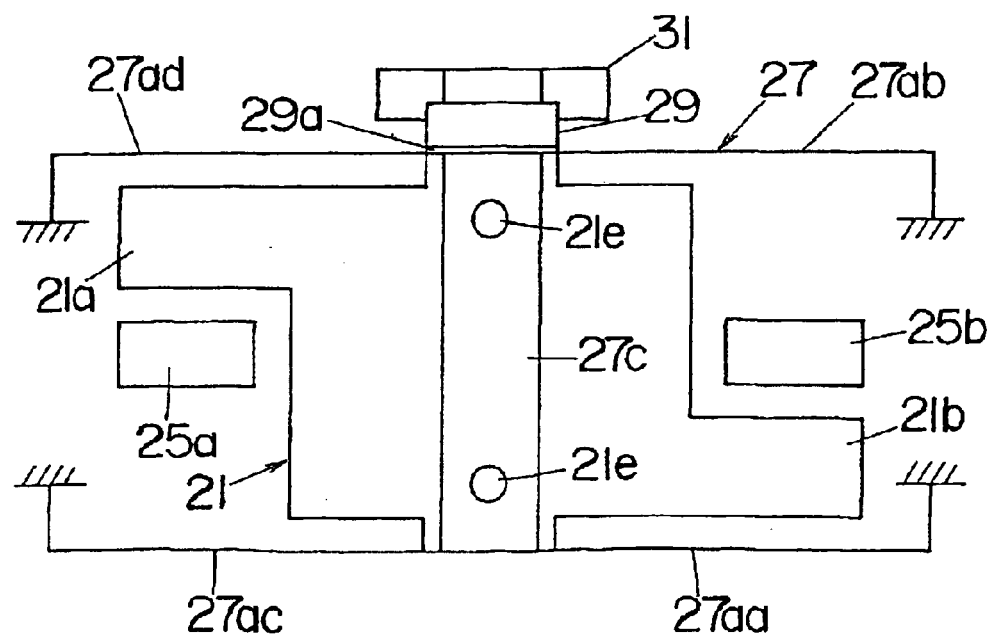
FIG. 23 is a plan view of a functional arrangement of the electromagnetic driver.
Figure 24:
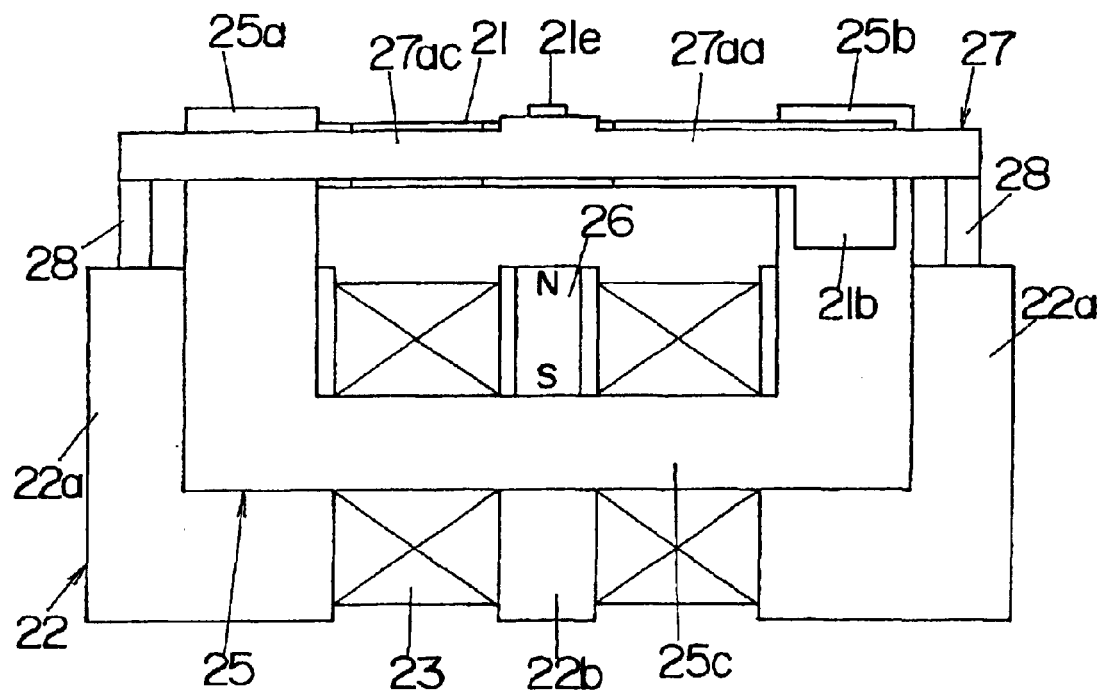
FIG. 24 is a front view of the same.
Figure 25:
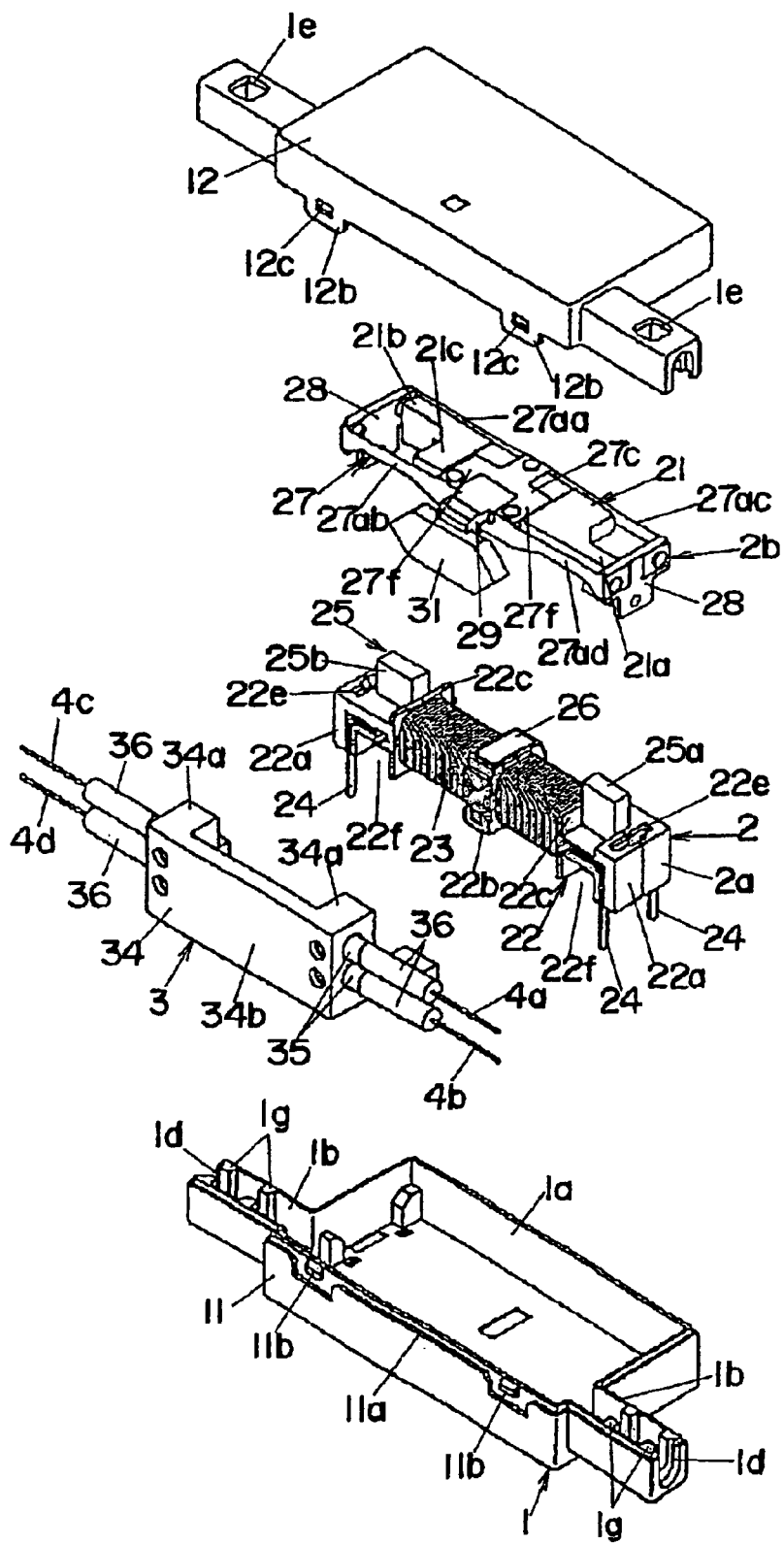
FIG. 25 is an exploded perspective view of an optical switch showing a fourth embodiment of the present invention.
Figure 26:
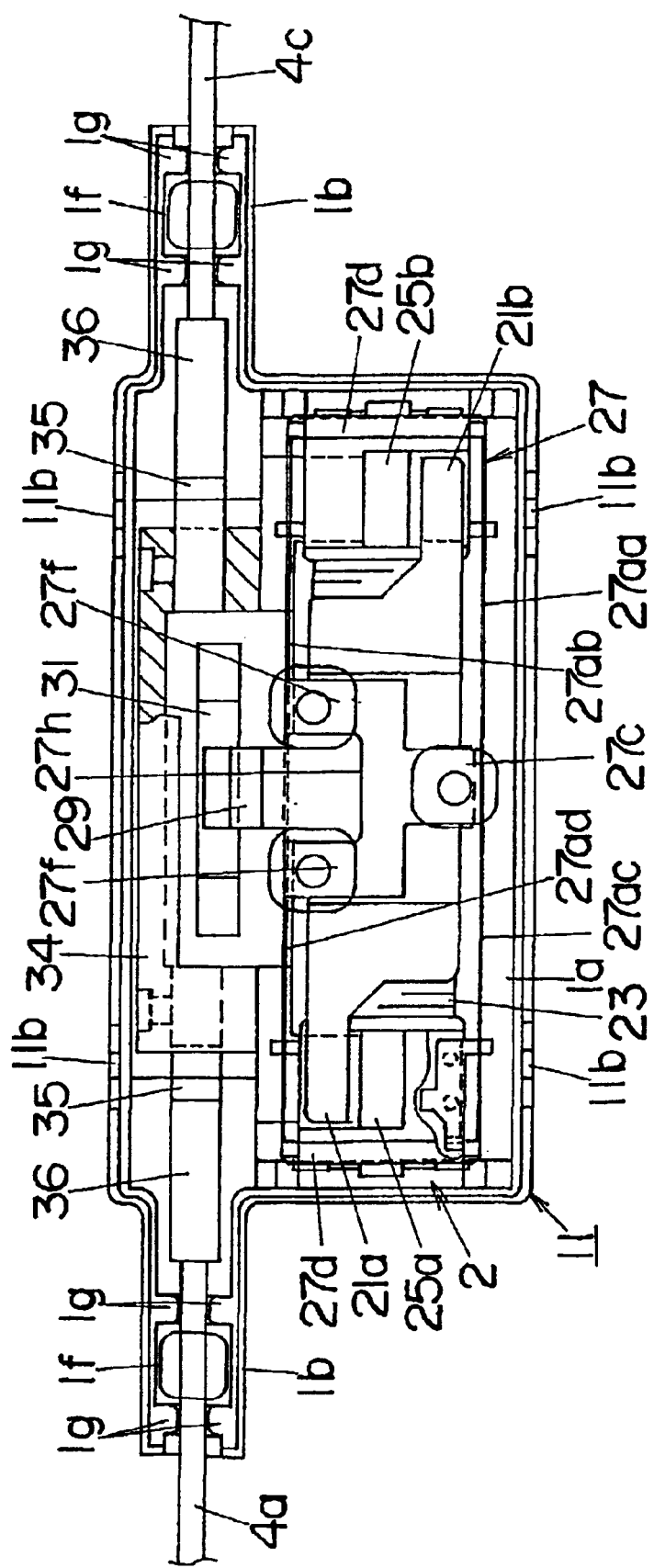
FIG. 26 is a plan view of the same with its cover removed off.
Figure 27:
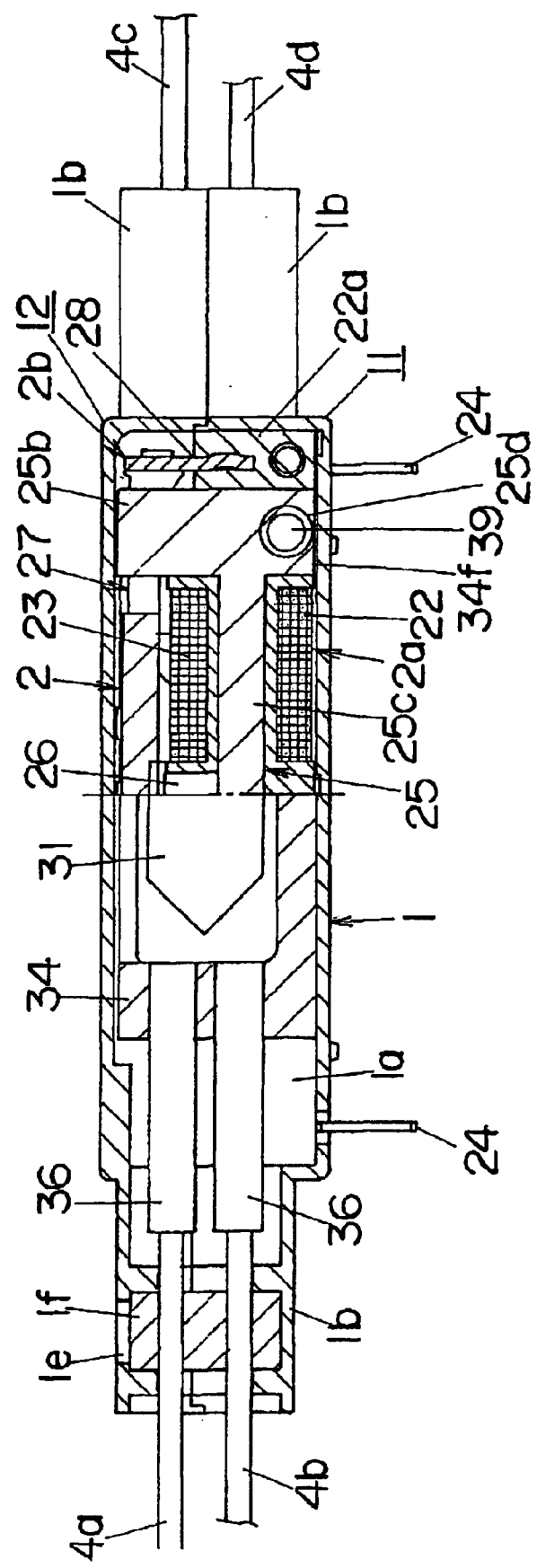
FIG. 27 is a longitudinal cross sectional view of the same.
Figures 28, 29:
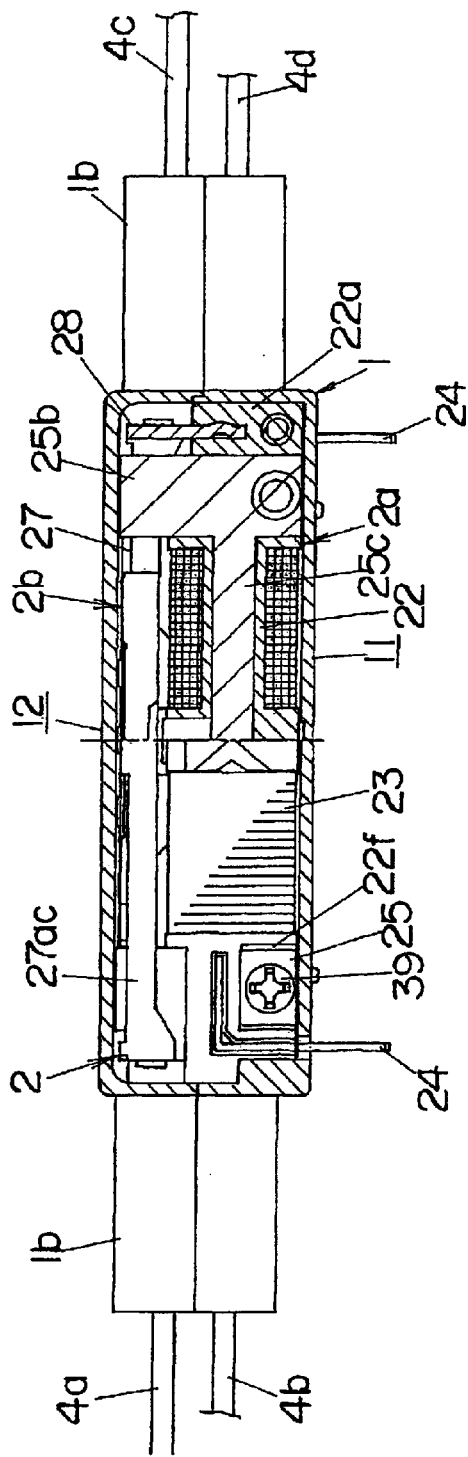
FIG. 28 is a longitudinal cross sectional view of the same.
FIG. 29 is a side view of the same.
Figure 30:
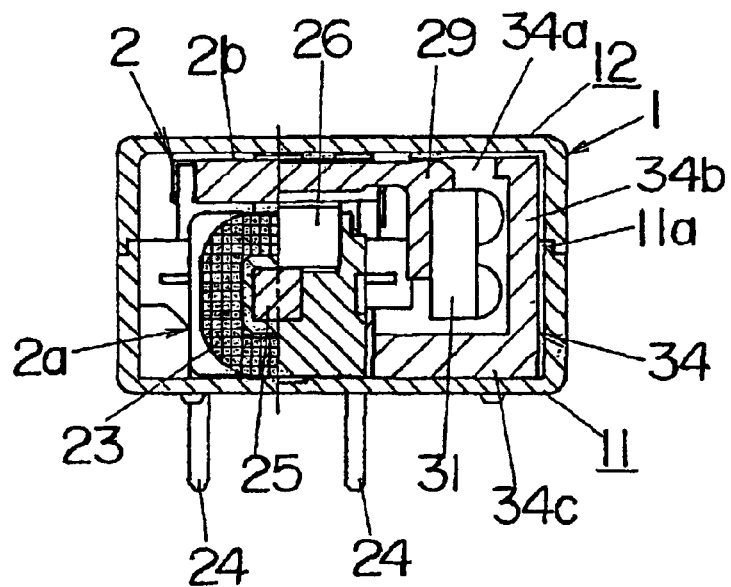
FIG. 30 is a transverse cross sectional view of the same.
Figure 31:
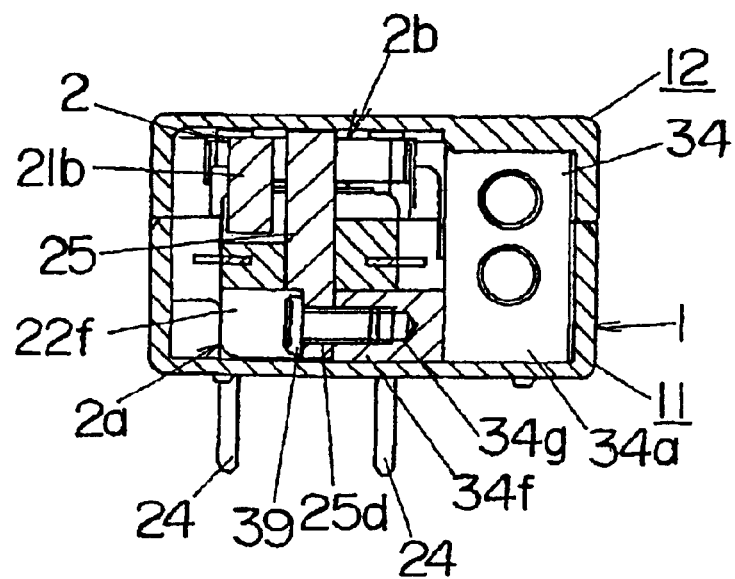
FIG. 31 is a transverse cross sectional view of the same.
Figure 32:
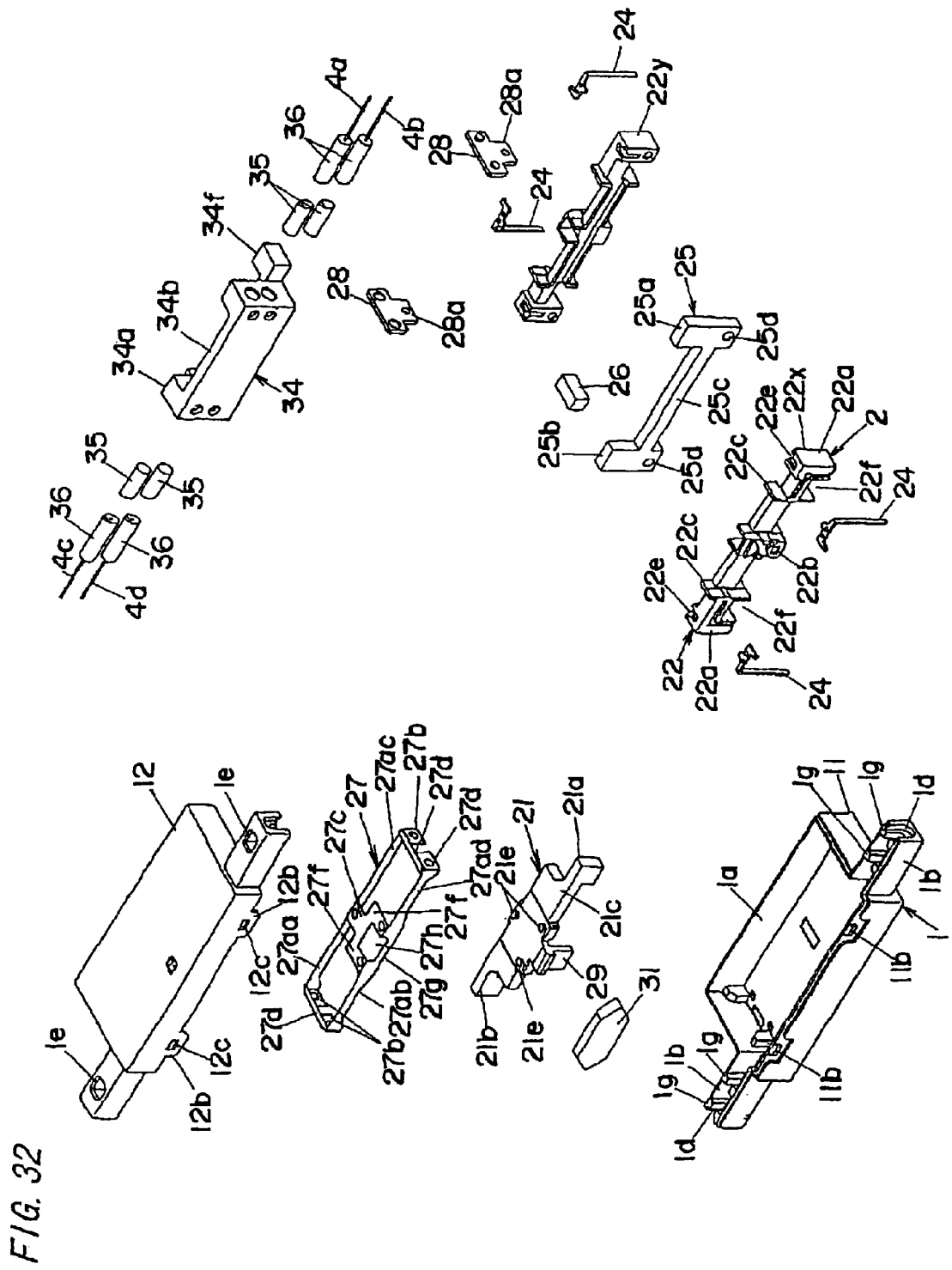
FIG. 32 is an exploded perspective view of the same.
Figure 33:
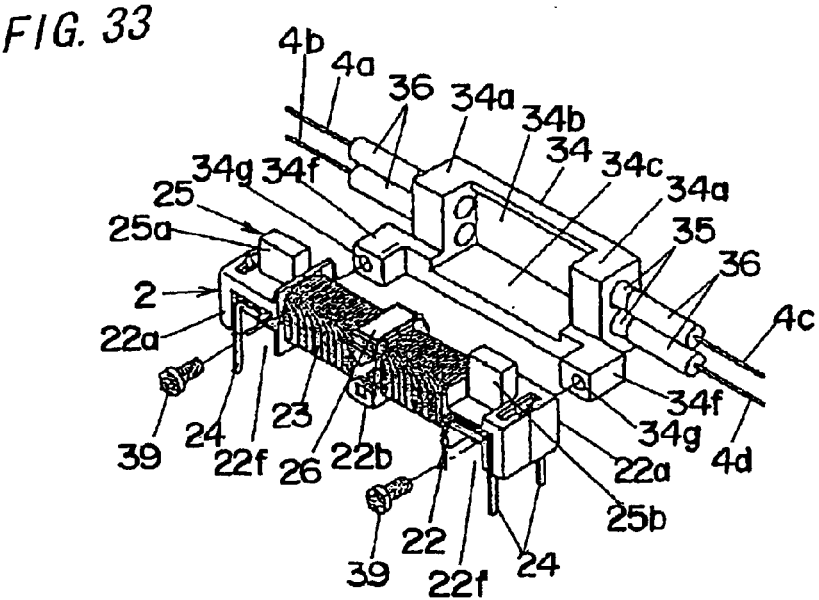
FIG. 33 is an exploded perspective view of a primary part of the same.
Figure 34:
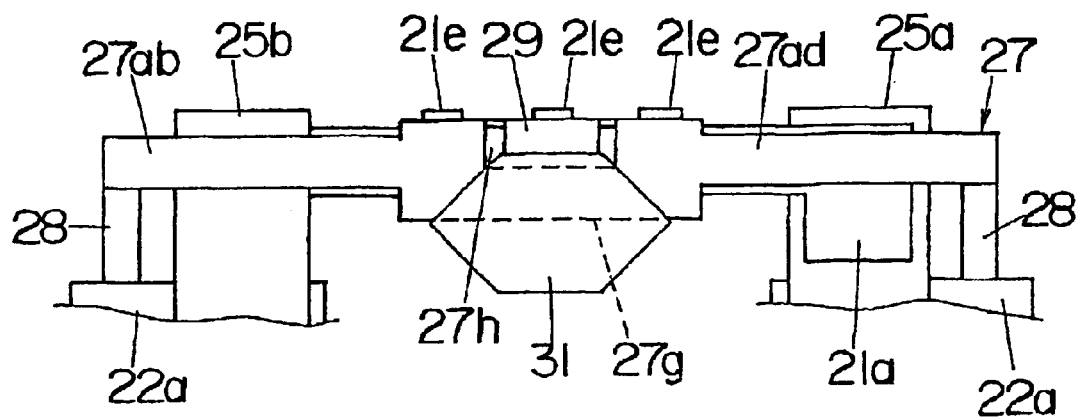
FIG. 34 is a primary back view of an electromagnetic driver of the same.
Figure 35:
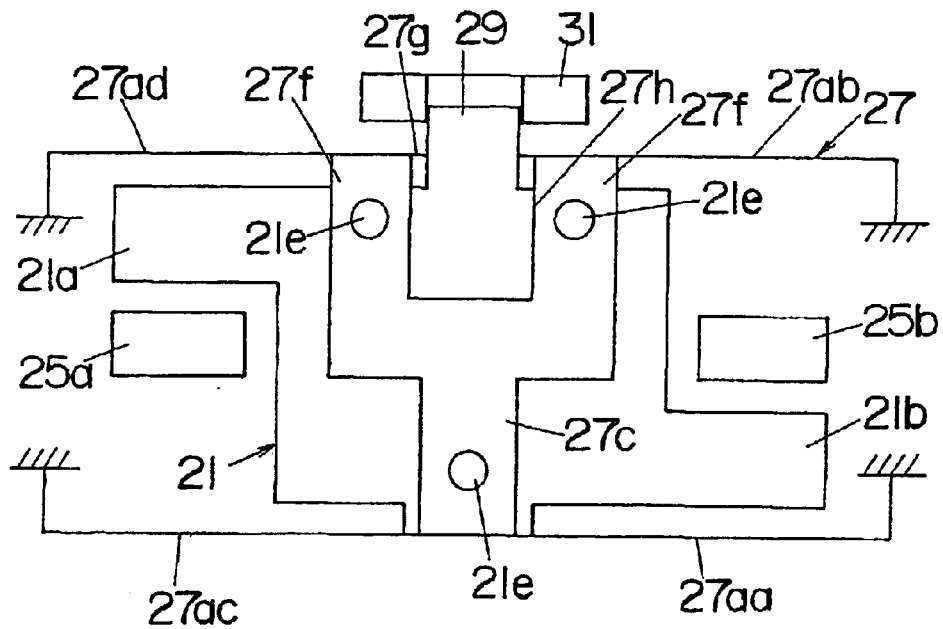
FIG. 35 is a plan view of a functional arrangement of the electromagnetic driver.
Figure 36:
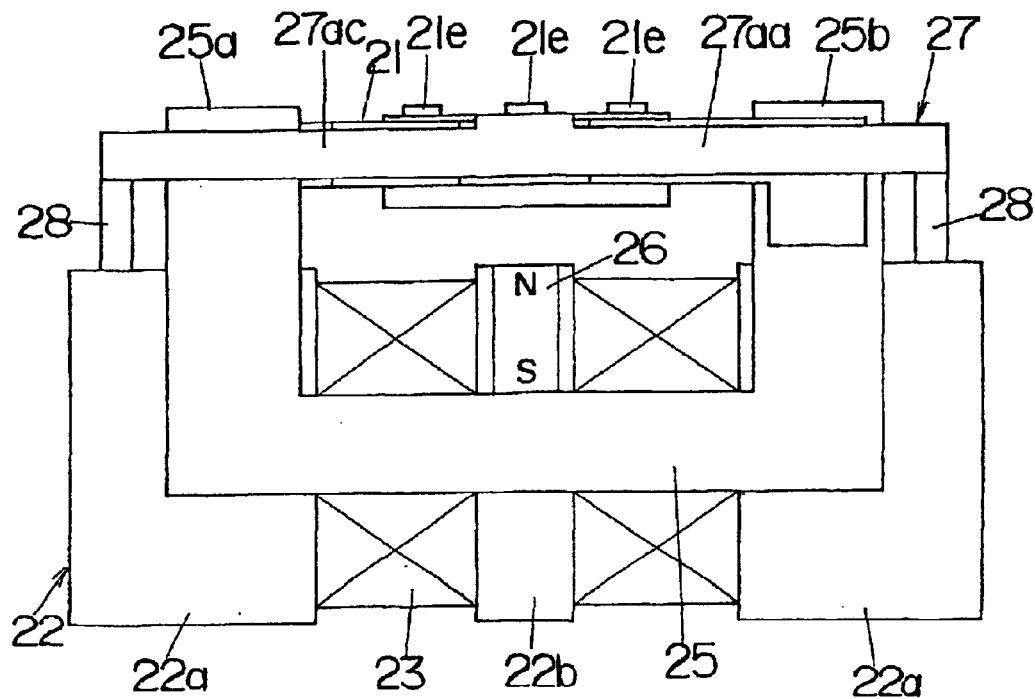
FIG. 36 is a front view of the electromagnetic driver of the same.

While the prism 31 is mounted to the armature 21 by the prism mounting assembly (the holder plate 32 and the adjuster plate 33) in the previous embodiment, it is mounted on a prism mounting bed 29 provided integral with one side of the armature 21 as shown in FIGS. 22 to 24. More specifically, the prism 31 is bonded to the prism mounting bed 29. The prism mounting bed 29 is located at the lengthwise center of the armature 21 to, extend across the spring strip 27a. The prism mounting bed 29 has a fitting recess 29a provided in the distal end thereof for accepting an intermediate of the spring strip 27a (one end of the joint strip 27c). This allows the prism mounting bed 29 to be provided integral with the armature 21 while the balancing spring 27 is simplified in the shape. The other components and actions are identical to those of the first embodiment.

(Fourth Embodiment)

This embodiment has the balancing spring 27 of the first embodiment modified in the shape, as shown in FIGS. 25 to 36, and the prism mounting bed 29 provided integral with the armature 21 like the third embodiment. Throughout the drawings, like components are denoted by like numerals and will be explained in no more detail.

The balancing spring 27 of this embodiment has the joint strip 27c modified into a Y shape having two branches 27f at one end along the movement of the armature 21 (in a widthwise direction). The two branches 27f are coupled integral with two spring segments 27ab and 27ad respectively. The Y shaped joint strip 27c is hence joined at its three legs to three pegs 21e of the armature 21 respectively. The balancing spring 27 has a frame strip 27g joined integrally between the two spring segments 27ab and 27ad. There is a window 27h defined by the frame strip 27g, the two spring segments 27ab and 27ad, and the branches 27f of the joint strip 27c. The prism mounting bed 29 provided integral with the armature 21 is accommodated in the window 27h. As a result, the prism mounting bed 29 provided integral with the armature 21 is clearly accepted in the window 27h of the balancing spring 27 thus interrupting none of the spring segments 27ab and 27ad.

The lens holder platform 34 of this embodiment has the two mounting tabs 34d replaced by two mounting legs 34f. The mounting legs 34f extend outwardly from both ends of the bottom wall 34c towards the electromagnetic driver 2. Each of the mounting legs 34f has a screw hole 34g provided in a distal side thereof. The terminal bed 22a of the coil frame 22 in the electromagnetic driver 2 has a couple of holding recesses 22f provided therein opening at both widthwise ends. The iron core 25 is exposed partially in the holding recesses 22f. Particularly, each exposed portion in the holding recess 22f has a through hole 25d provided there across for alignment with the screw hole 34g of the lens holder platform 34. The coil frame 22 comprises two halves 22x and 22y joined to each other to sandwich the iron core 25 from both ends (See FIG. 32).

The mounting legs 34f are so sized that their distal sides come in direct contact with the iron core 25 when inserted into the corresponding holding recesses 22f of the coil frame 22. As its screw holes 34g are aligned with the corresponding through holes 25d, the lens holder platform 34 can be tightened to the iron core 25 by a couple of retaining screws 39 passing through the through holes 25d and screwing into the screw holes 34g. The lens holder platform 34 is joined by the two retaining screws 39 to the both lengthwise ends of the center 25c of the iron core 25. As a result, the joining between the lens holder platform 34 and the iron core 25 can be solid and stable. Although the joining between the lens holder platform 34 and the iron core 25 is implemented by the two retaining screws 39 in this embodiment, it may be feasible by adhesive bonding or welding.

The interface between the lens holder platform 34 and the iron core 25 is a reference plane for determining the position of the lenses 35 (i.e. the position of the apertures for holding the lenses 35) while the iron core 25 also determines a reference plane for positioning the armature 21. Accordingly, the positional relationship between the prism 31 driven by the armature 21 and a set of the lenses 35 held in the lens holder platform 34 can be controlled at higher precision. Also, as the prism 31 and the lenses 35 are positioned by the action of the iron core 25, their positional relationship can remain at high precision without significant errors.

The cover 12 has an opening 1e provided at the portion opposite to each conduit 1b for accommodating the optical fibers 4a, 4b, 4c, and 4d. The opening 1e is designed for applying doses of an adhesive if to the incoming ends of each pair of the optical fibers 4a and 4b or 4c and 4d accommodated in the conduit 1b. In addition, a rib 1g is provided on each end at the conduit 1b for interrupting the escape of the adhesive If. Accordingly, when each of the optical fibers is bonded by the adhesive If into the conduit 1b, its pigtail 36 can be protected from any external tension applied through the optical fiber.

(Fifth Embodiment)

Figure 37:
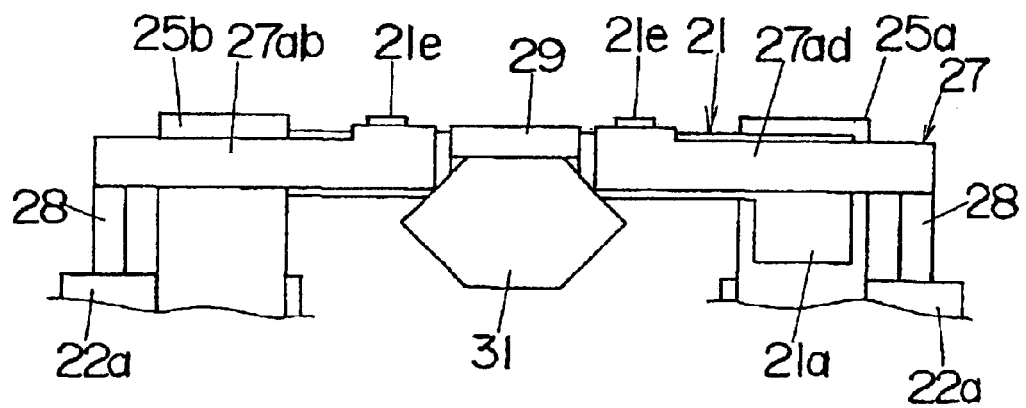
FIG. 37 is a primary back view of an electromagnetic driver of an optical switch showing a fifth embodiment of the present invention.
Figure 38:
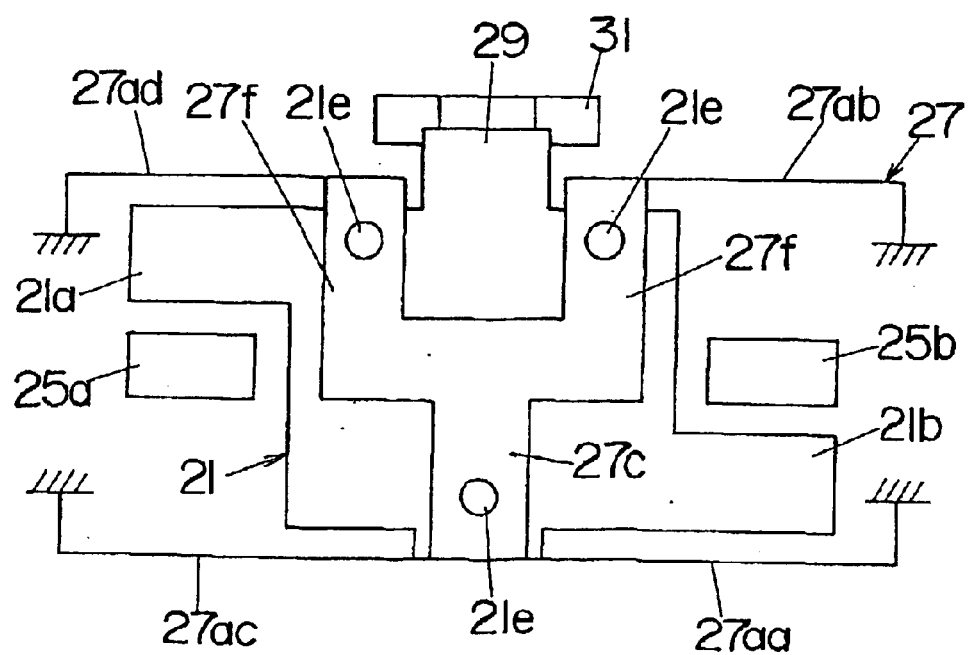
FIG. 38 is a plan view of a functional arrangement of the electromagnetic driver.
Figure 39:
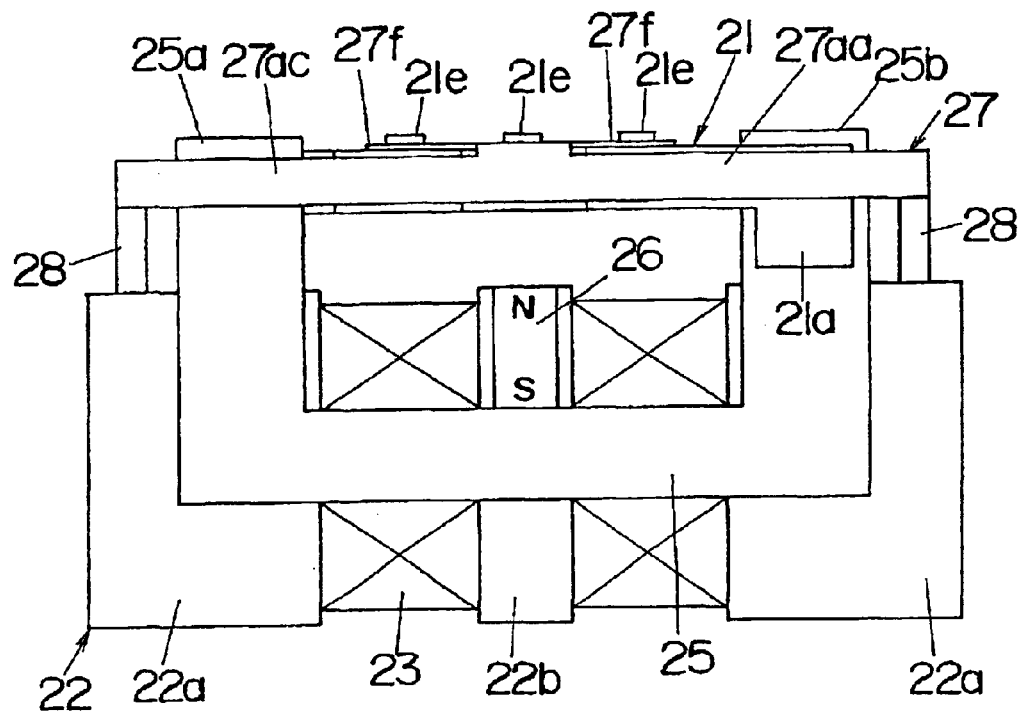
FIG. 39 is a front view of the electromagnetic driver.

This embodiment eliminates the frame strip 27g of the fourth embodiment as shown in FIGS. 37 to 39. As the two spring segments 27ab and 27ad are joined to each other by only the branch 27f, the resistance of the armature 21 to any impact exerted along its thickness direction may be less favorable than that of the fourth embodiment. However, this embodiment allows the other functions of the fourth embodiment to remain unchanged and can hence be utilized preferably under less impact conditions.

(Sixth Embodiment)

Figure 40:
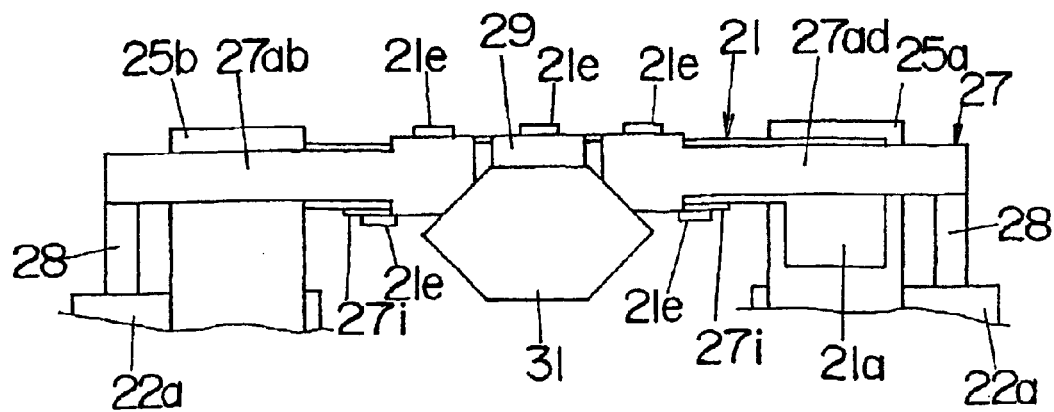
FIG. 40 is a primary back view of an electromagnetic driver of an optical switch showing a sixth embodiment of the present invention.
Figure 41:
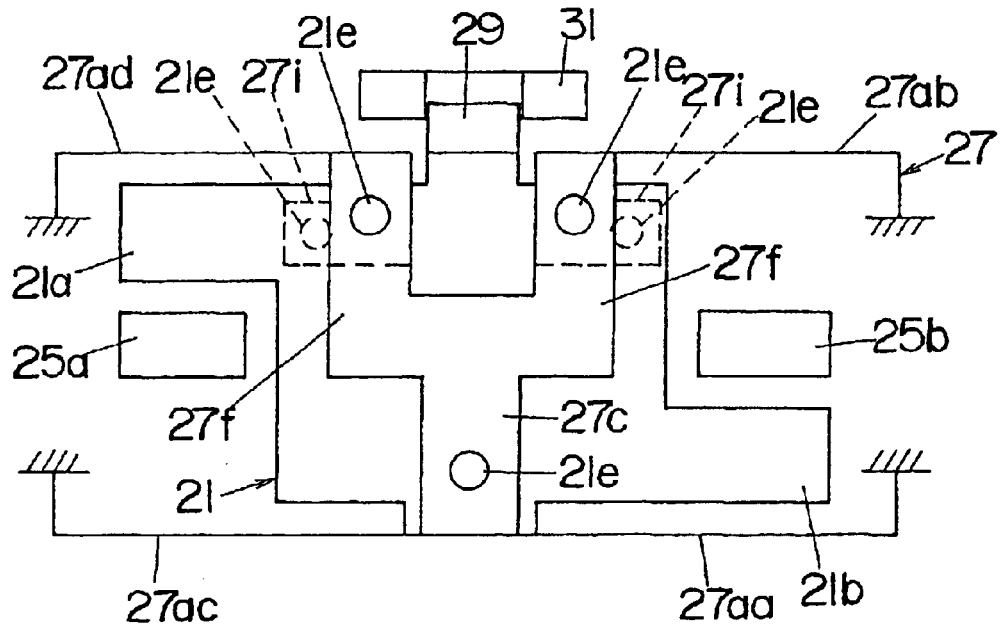
FIG. 41 is a plan view of a functional arrangement of the electromagnetic driver.
Figure 42:
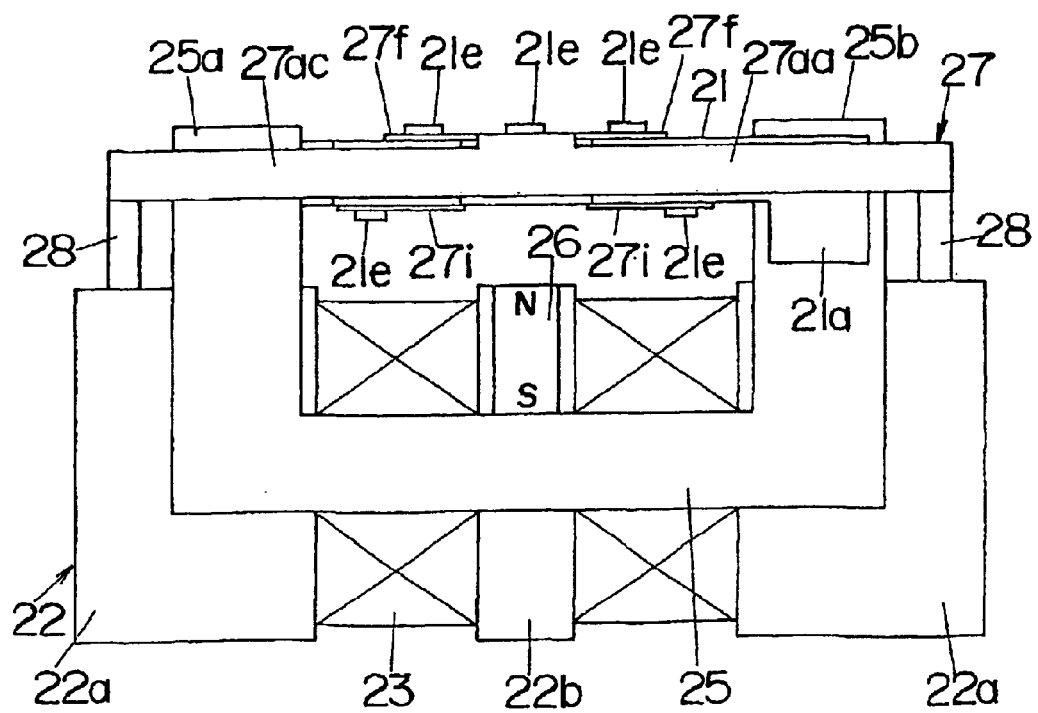
FIG. 42 is a front view of the electromagnetic driver.

This embodiment has auxiliary mounting strips 27i added to the arrangement of the fifth embodiment as partially overlapped with and attached to the bottom of the armature 21, as shown in FIGS. 40 to 42. One end of each spring segment 27ab or 27ad is provided integrally at one side with the branch 27f and at the other side with the auxiliary mounting strip 27i. In other words, the armature 21 is sandwiched between the branch 27f and the auxiliary mounting strip 27i. More particularly, the auxiliary mounting strip 27i like the joint strip 27c is joined to a peg 21e of the armature 21. While the other components of this embodiment are identical to those of the fifth embodiment, the auxiliary mounting strips 27i guarantee the joining strength of the spring segments 27ab and 27ad to the armature 21. Accordingly, the resistance of the armature 21 to any impact applied along its thicknesswise direction (orthogonal to the movement of the armature 21 and the direction of extensions of the spring segments 27ab and 27ad) can be higher than that of the fifth embodiment.

(Seventh Embodiment)

Figure 43:
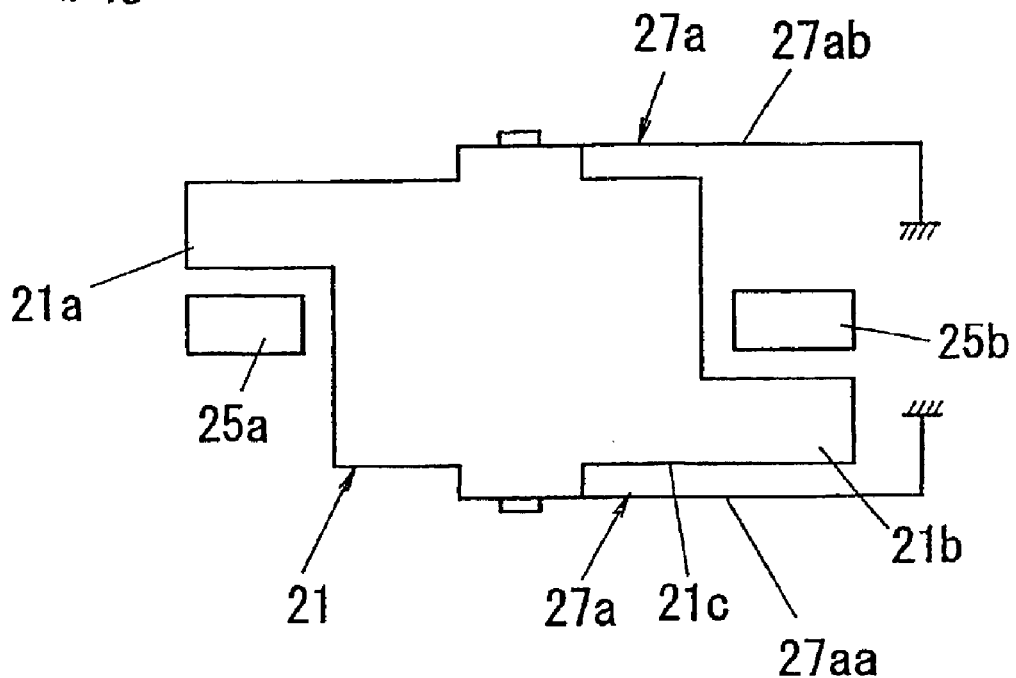
FIG. 43 is a plan view of a functional arrangement of an electromagnetic driver of an optical switch showing a seventh embodiment of the present invention.
Figure 44:
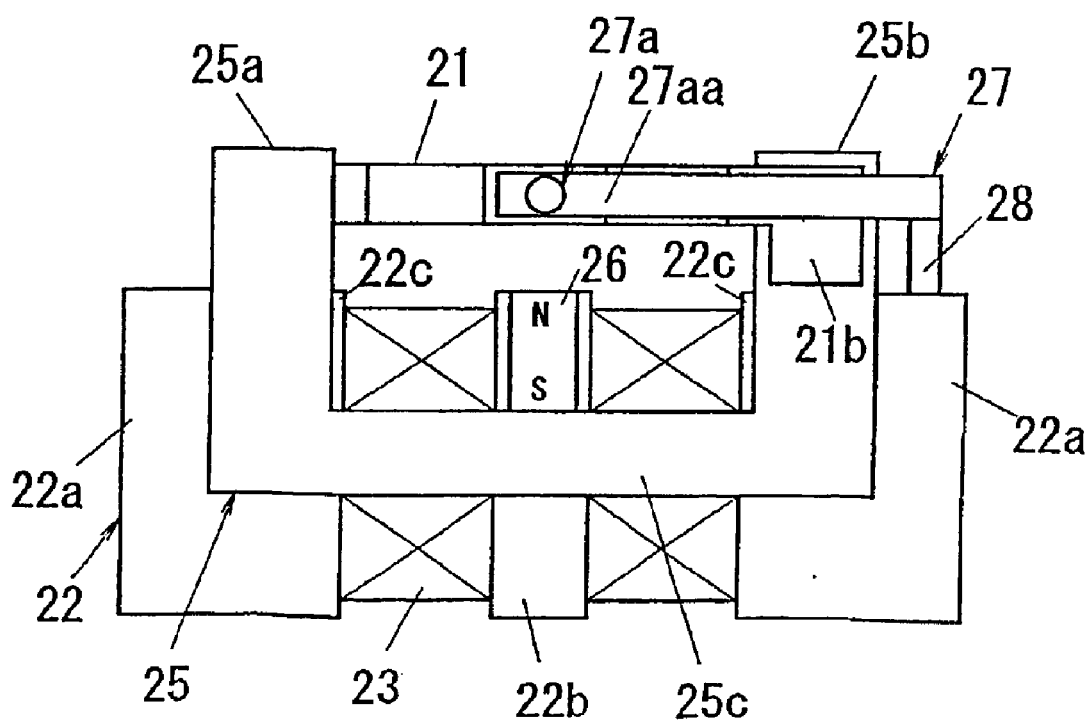
FIG. 44 is a front view of the electromagnetic driver.

This embodiment has the balancing spring 27 modified comprising two spring segments 27aa and 27ab provided on both sides of the armature 21 and joined to a single retaining sheet 28, as shown in FIGS. 43 and 44. In other words, the other retaining sheet 28 and the spring segments 27ac and 27ad of the balancing spring 27 in the first embodiment all are eliminated.

Figure 45:
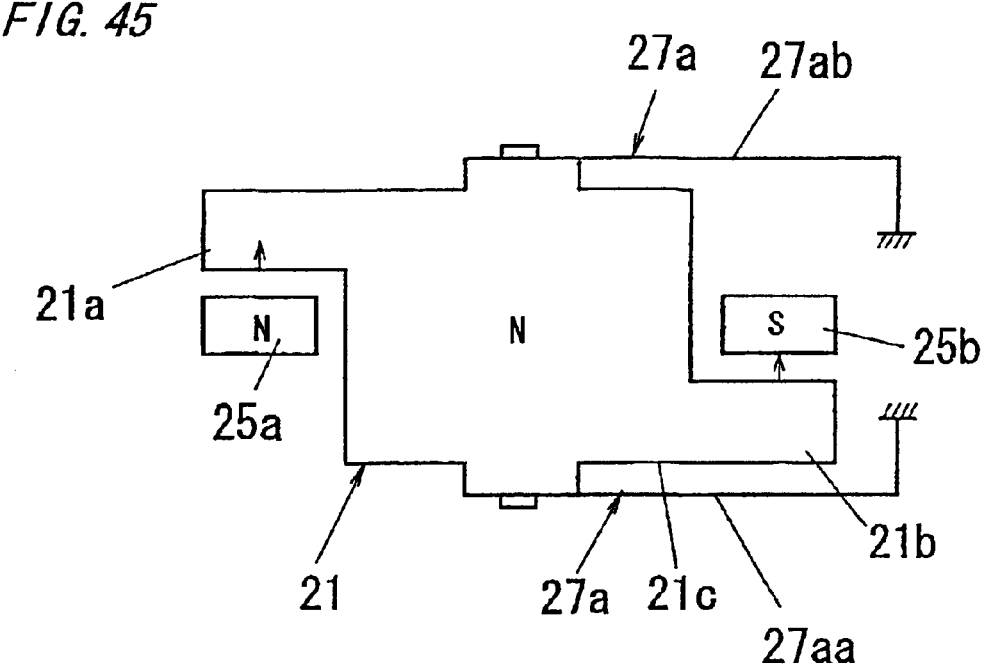
FIG. 45 is an explanatory view showing an action of the same.
Figure 46:
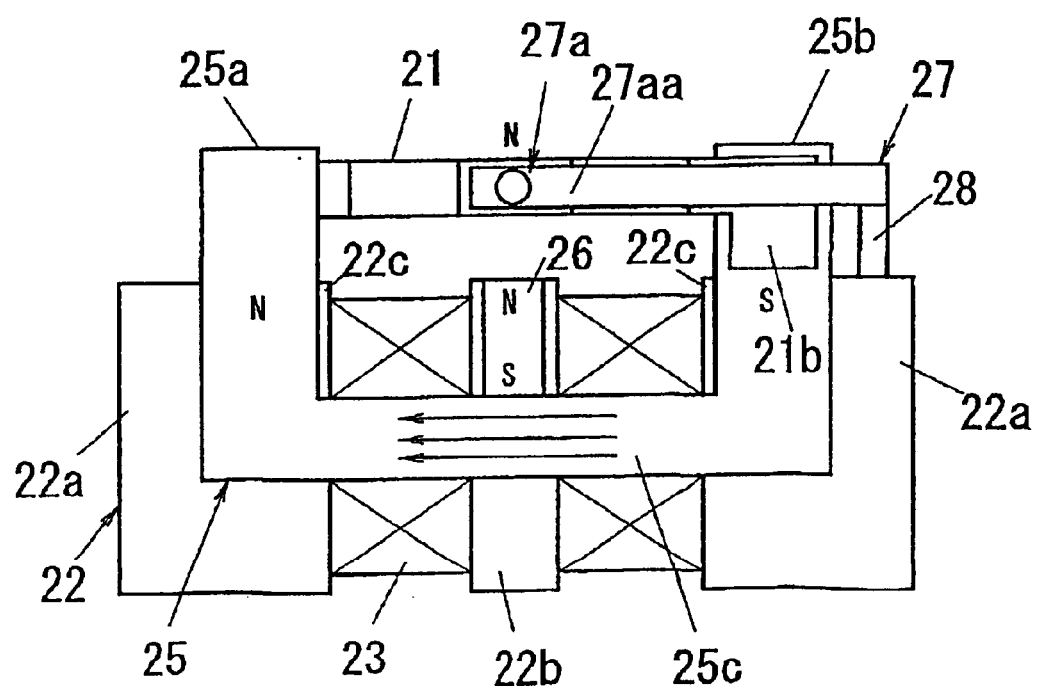
FIG. 46 is an explanatory view showing an action of the same.
Figure 47:
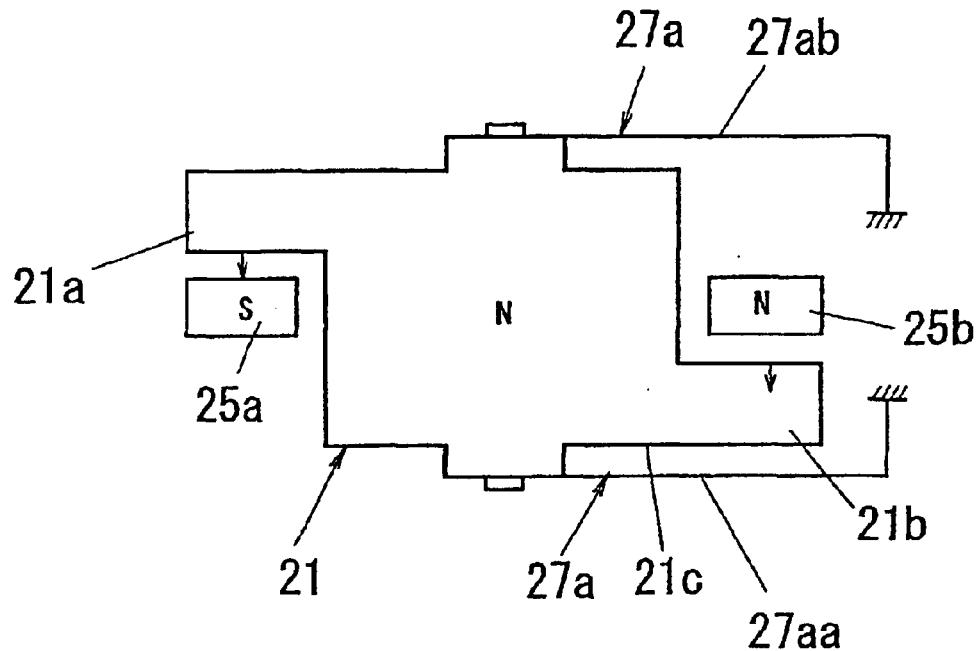
FIG. 47 is an explanatory view showing an action of the same.
Figure 48:
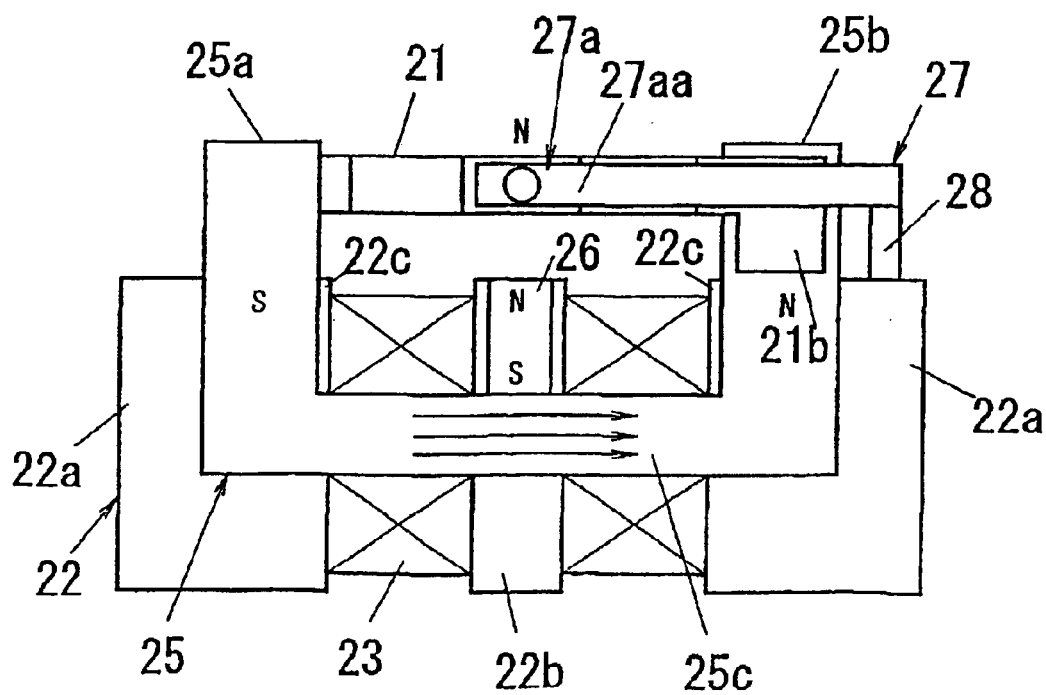
FIG. 48 is an explanatory view showing an action of the same.

The arrangement of this embodiment can perform the same action as of the first embodiment. Referring to FIGS. 45 and 46, the coil 23 is energized to turn the left polar portion 25a of the iron core 25 to N pole while the N pole of the permanent magnet 26 faces the armature 21. This causes the left contact portion 21a of the armature 21 to generate an upward repulsion while the other contact portion 21b to generate an upward attraction denoted by the arrows in FIG. 45, thus initiating the direct contact between the other contact portion 21b and the polar portion 25b. In reverse, when the coil 23 is energized to turn the polar portion 25a of the iron core 25 to S pole, as shown in FIGS. 47 and 48, the left contact portion 21a of the armature 21 generates a downward attraction while the other contact portion 21b generating a downward repulsion denoted by the arrows in FIG. 47 thus coming into direct contact with the polar portion 25a. Similar to the action of the first embodiment, the prism 31 can be moved by the action of the armature 21 to switch the optical coupling of the four optical fibers 4a, 4b, 4c, and 4d from one mode to the other.

(Eighth Embodiment)

Figure 49:
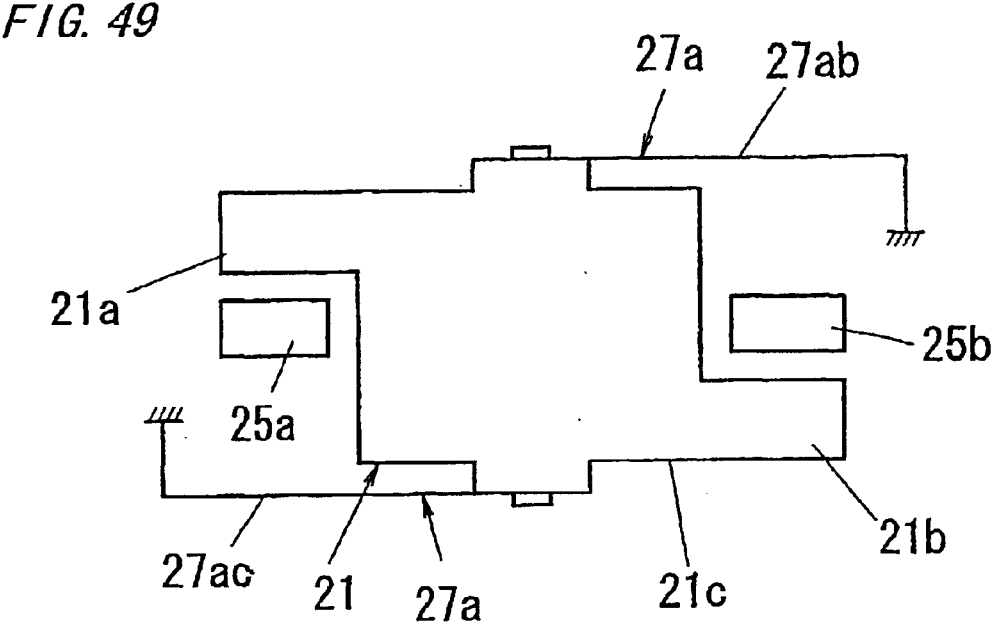
FIG. 49 is a plan view of a functional arrangement of an electromagnetic driver of an optical switch showing an eighth embodiment of the present invention.
Figure 50:
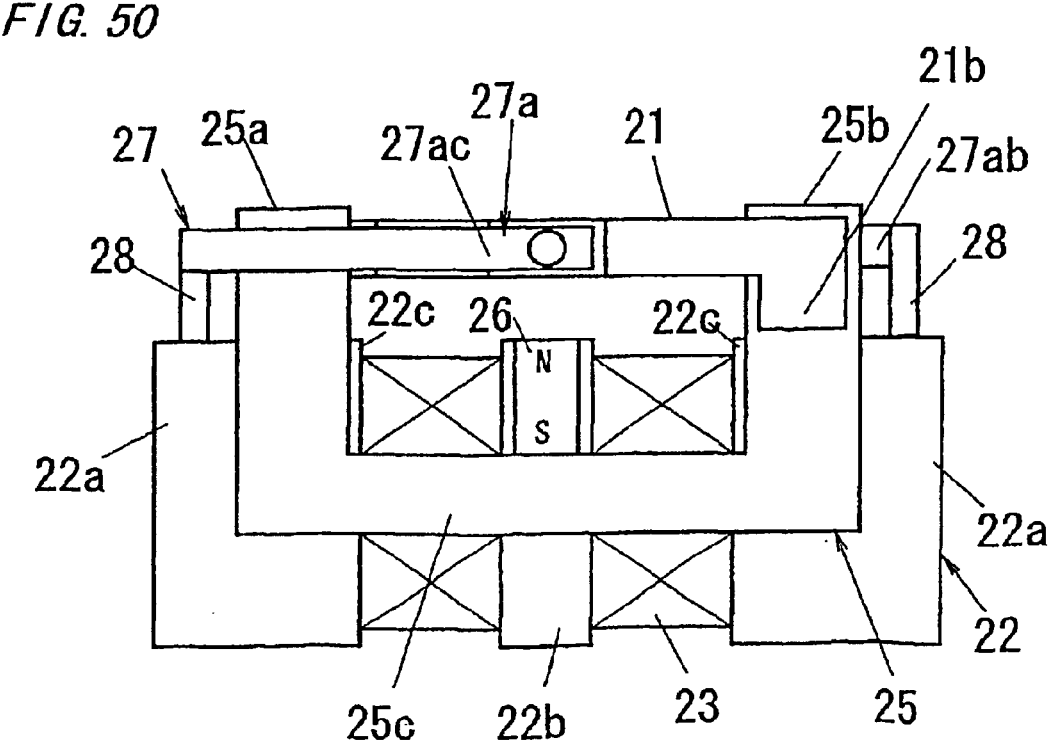
FIG. 50 is a front view of the electromagnetic driver.

This embodiment has the balancing spring 27 modified comprising two spring segments 27ab and 27ac provided on one side of the armature 21 and joined to the two retaining sheets 28 respectively, as shown in FIGS. 49 and 50. The spring segment 27ab and the contact portion 21b of the armature 21 are located on opposite sides of the polar portion 25b of the iron core 25 while the spring segment 27ac and the contact portion 21a of the armature 21 are located on opposite sides of the polar portion 25a of the iron core 25. This allows the armature 21 to be less movable along its thickness direction as compared with the seventh embodiment. As a result, the armature 21 can be inhibited from being displaced in its thickness direction by any external force to change the location of the prism 31. The other components and their actions are identical to those of the first embodiment.

(Ninth Embodiment)

Figure 51A:
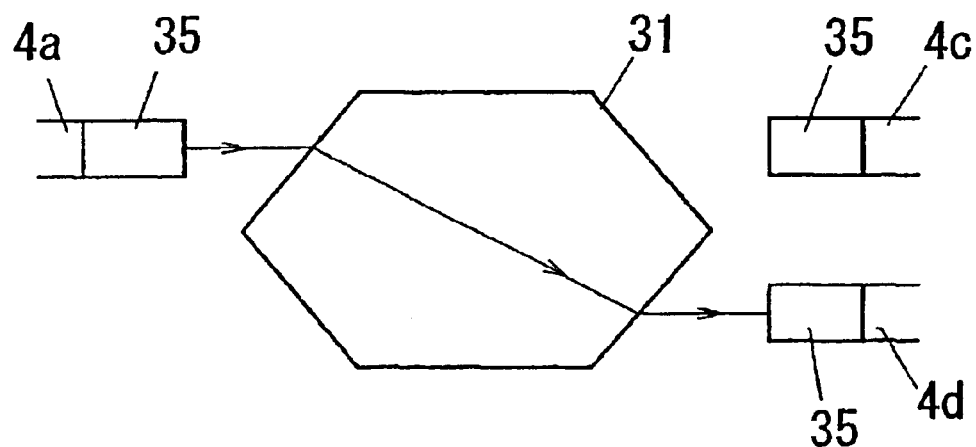
FIG. 51 is an explanatory view showing an action of an optical switch of a ninth embodiment of the present invention.
Figure 51B:
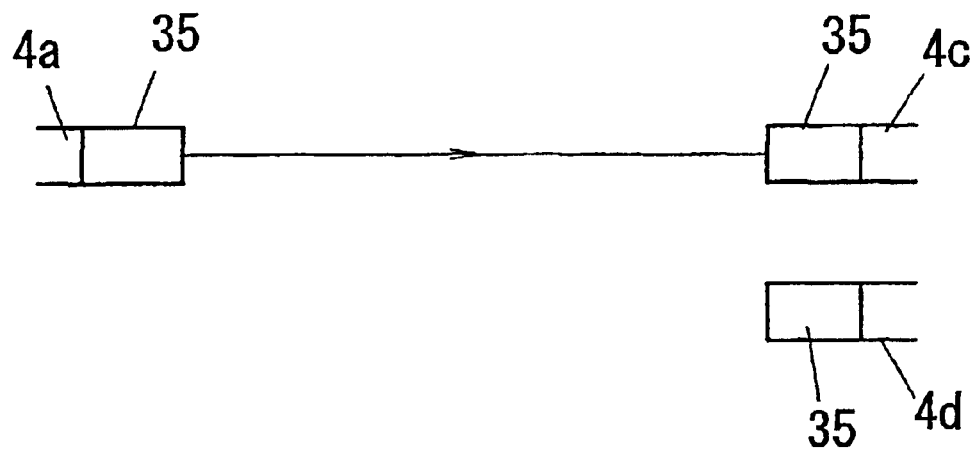

While the four optical fibers 4a, 4b, 4c, and 4d are provided for 2×2 switching actions in the first embodiment, this embodiment employs three of the optical fibers 4a to 4c in a one-to-two arrangement for 1×2 switching actions, as shown in FIG. 51. The other components and their actions are identical to those of the first embodiment.

(Tenth Embodiment)

Figure 52A:
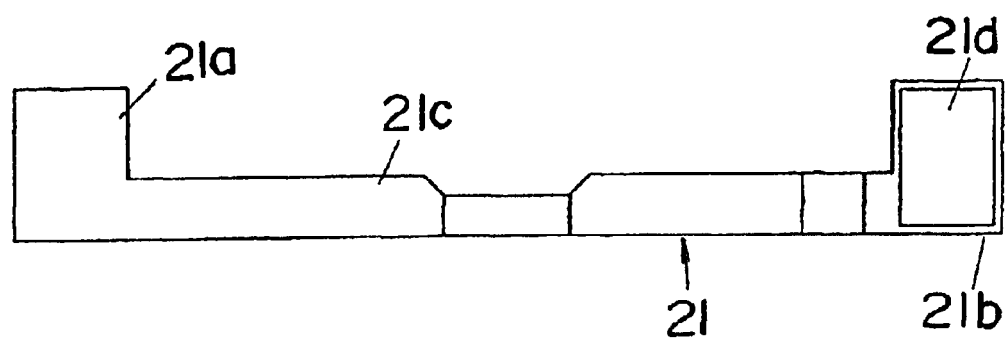
FIGS. 52(a) and 52(b) are a front view and a cross sectional view of an armature of an optical switch showing a tenth embodiment of the present invention.
Figure 52B:
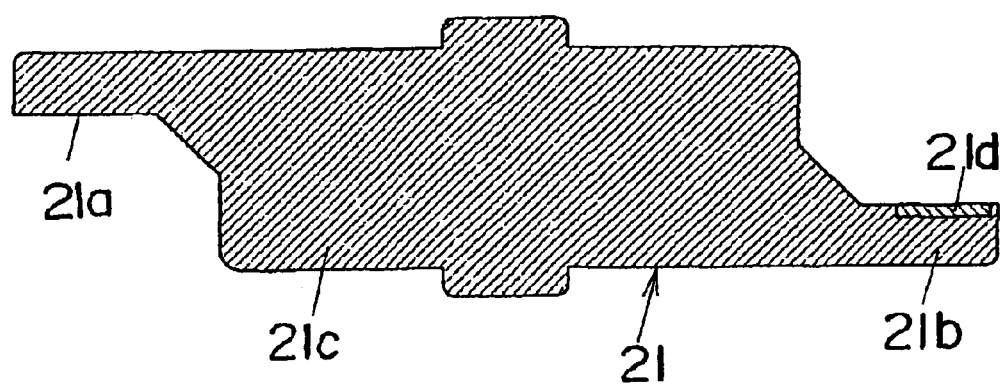
Figure 53:
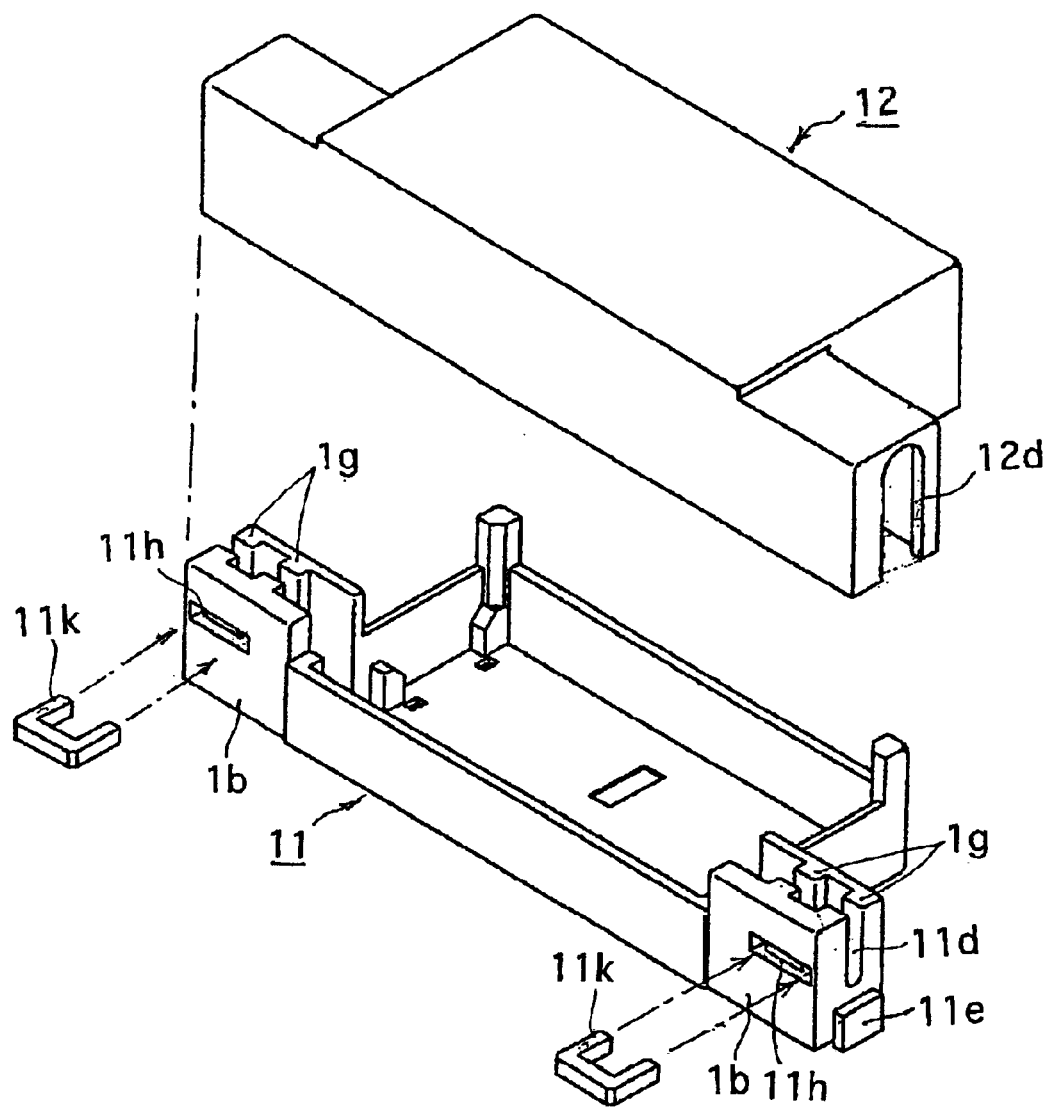
FIG. 53 is a perspective view showing modified forms of the cover and the base of the optical switch of the present invention.
Figure 56:
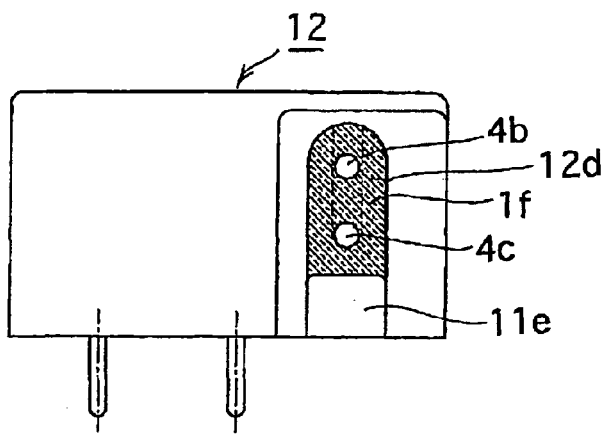
FIG. 56 is a side view of the same.
Figure 57A:
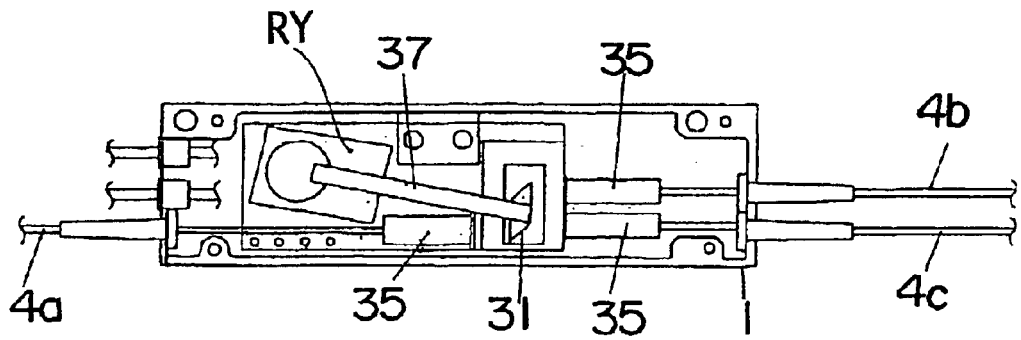
FIG. 57 is a cross sectional view of a conventional optical switch.
Figure 57B:
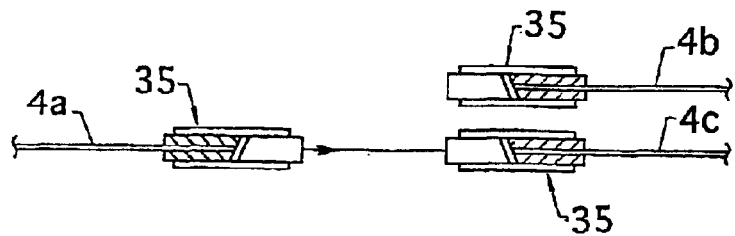
Figure 57C:
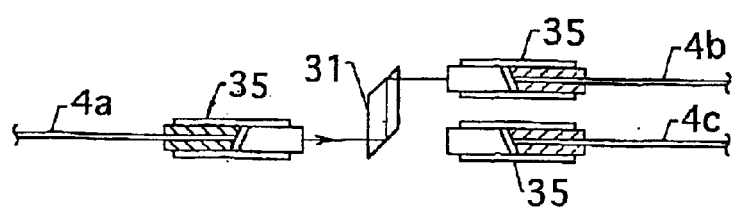
Figure 58A:
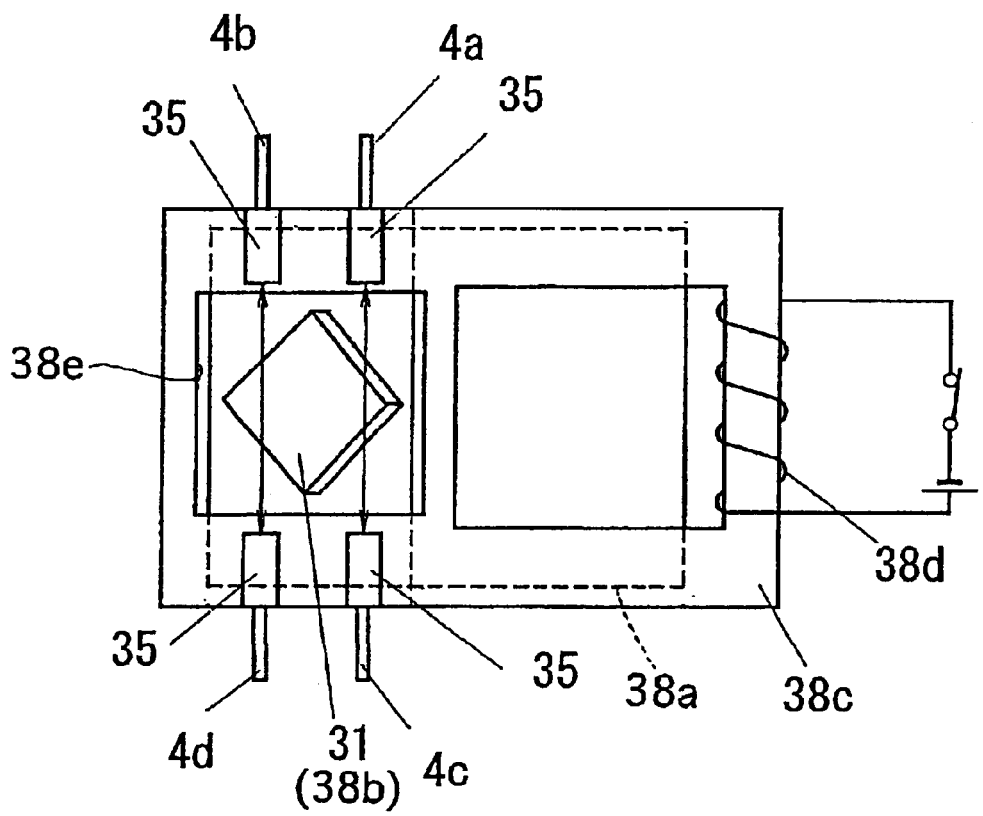
FIGS. 58(a) and 58(b) are a plan view and a side view of another conventional optical switch.
Figure 58B:
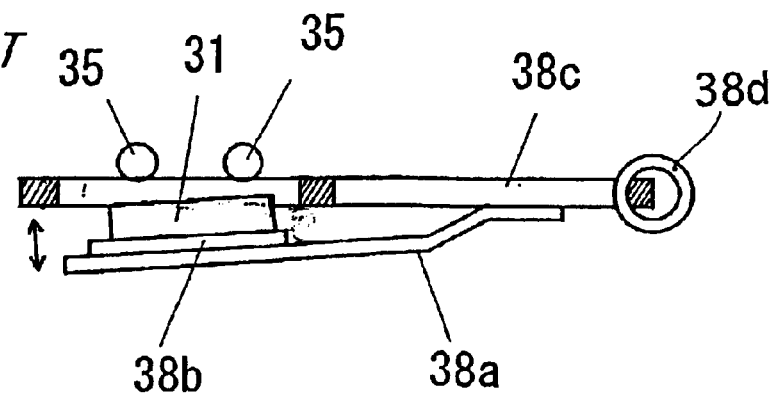

While the first embodiment has the armature 21 arranged movable between the two different positions and held at one of the two position by the magnetic force of the permanent magnet 26 for bistable actions, this embodiment allows the armature 21 to constantly return back to desired one of the two positions whenever the coil 23 is deenergized for monostable action. For the monostable action, the armature 21 has a residual plate 21d of a nonmagnetic metal provided on one 21b of the two contact portions thereof to face the polar portion 25b, as shown in FIG. 52. As the action of the residual plate 21d lessens the attraction between the contact portion 21b and the polar portion 25b, the monostable action of the armature 21 can favorably be controlled by modifying a combination between the urging force of the balancing spring 27 and the magnetic force of the permanent magnet 26. As a result, the direct contact between the contact portion 21a and the polar portion 25a for the monostable action can readily be implemented upon de-energization of the coil 23. The other components and their actions are identical to those of the first embodiment.

(Eleventh Embodiment)

Alternatively, the first embodiment may be modified where the balancing spring 27 remains urging the armature 21 to hold its contact portion 21a in direct contact with the polar portion 25a of the iron core 25 in a normal state as shown in FIG. 3. Accordingly, when the coil 23 is deenergized, the monostable action for contacting between the contact portion 21a and the polar portion 25a can certainly be conducted.

The urging force of the balancing spring 27 against the armature 21 may be replaced with equal success by the action of an arrangement where the two retaining sheets 28 are dislocated from the widthwise center on the coil frame 22 of the coil block 2a or arranged in an asymmetry pattern along the widthwise direction of the coil block 2a to have the widthwise center of the armature block 2b dislocated from that of the coil block 2a when the balancing spring 27 is unloaded. The other components and their actions are identical to those of the first embodiment. This embodiment may also be equipped with the residual plates 21d of the tenth embodiment.

(Twelfth Embodiment)

This embodiment will be explained in the form of an optical switch referring to FIGS. 53 to 56. The optical switch of this embodiment is substantially a modification of the fourth embodiment where the conduits 1b of the base 11 for accommodating the four optical fibers 4a, 4b, 4c, and 4d have sealing functions. The outer end of the conduit 1b is defined by an inverted-U shaped opening 12d of the cover 12 and a U shaped opening 11d of the base 11. When the cover 12 and the base 11 are joined together, projections lie provided below the U shaped openings 11d on the base 11 are fitted into the lowermost of the inverted-U shaped openings 12d of the cover 12 to develop a recessed space about each group of the optical fibers. The recessed space is then filled with the adhesive 1f to seal off the incoming ends of the body 1.

For inhibiting the escape of the adhesive 1f from the recessed space, a set of ribs 1g and 1h are provided on the inner side at each conduit 1b of the body 1. Also, the base 11 has an opening 11h provided in each end thereof for accepting a U shaped key ilk which is shaped to fill up the space between the two, upper and lower, optical fibers. Accordingly, any space at each incoming end of the body 1 can be filled up with a smaller amount of the adhesive if. The cover 12 is arranged for closely fitting on the base 11 with its lower end coming flush with the bottom of the base 11. Also, the base 11 has a pattern of groove provided in the rim of the bottom thereof as well as about the terminal pin 24 holes. The joint between the cover 12 and the base 11 can hence be sealed off by the adhesive If being distributed throughout the groove.

The present invention is not intended to limit any combination of the illustrated embodiments. Also, while the prism 31 in each of the embodiments is provided on one side of the movement of the armature 21, two of the prisms 31 may be located on both sides of the armature 21 respectively.

Industrial Utilization

The optical switch of the present invention is designed for switching the light path of optical signals to be transmitted in the optical fibers by the presence and absence modes of the prism. More specifically, the prism can be advanced and retracted by the action of an actuator which is controlled by energization of the electromagnetic coil.

What is claimed:

1. An optical switch for switching the light path between collimating lenses optically coupled to the ends of corresponding optical fibers by the advancing and retracting movements of a prism, comprising:

a body incorporating an optical switch housing;

an electromagnetic driver including an armature arranged to hold the prism and a coil block for driving the movement of the armature by means of magnetic actions, the coil block including an iron core having two magnetic polar portions provided at both ends thereof, a coil for exciting the iron core, and a permanent magnet for magnetizing the armature, the armature including a first contact portion located opposite to one side of one of the two magnetic polar portions which faces one direction of the movement of the armature and a second contact portion located opposite to one side of the other magnetic polar portion which faces the other direction of the movement of the armature; and a leaf spring resilient in the moving direction of the armature consisting mainly of at least two parallelly extending spring strips, each of the spring strips is fixedly mounted at one end to the body and at the other end to an intermediate region between the two contact portions of the armature thus to spatially hold the armature and the prism for linear movement, wherein the electromagnetic driver and the prism are disposed next to each other along the moving direction of the armature, and the armature and the prism can linearly be moved at a right angle to the light path between the lenses when the optical switch is in action.

2. An optical switch according to claim 1, wherein the electromagnetic driver performs a bistable action for holding the armature by the magnetic force of the permanent magnet at each of the two positions, where the first contact portion of the armature comes into direct contact with the corresponding polar portion of the iron core and where the second contact portion of the armature comes into direct contact with the other polar portion of the iron core.

3. An optical switch according to claim 1, wherein the electromagnetic driver performs a monostable action for holding the armature by the magnetic force of the permanent magnet constantly at one of the two positions, where the first contact portion of the armature comes into direct contact with the corresponding polar portion of the iron core or where the second contact portion of the armature comes into direct contact with the other polar portion of the iron core.

4. An optical switch according to claim 1, wherein the number of the spring strips is four, and the armature is arranged between two pairs of the spring strips, each pair extending in one direction from each joint with the armature to one of the magnetic polar portion.

5. An optical switch according to claim 4, wherein the leaf spring has a joint strip thereof arranged extending in the moving direction of the armature and joined to the armature along the movement in an overlap relationship while the spring strips are arranged integrally with the ends of the joint strip in the moving direction of the armature.

6. An optical switch according to claim 5, wherein the prism is mounted to a prism mounting bed provided integral with at least one side of the armature.

7. An optical switch according to claim 6, wherein the joint strip has two branches thereof provided for accepting the prism mounting bed therebetween.

8. An optical switch according to claim 7, wherein the spring strips have a frame strip provided to join integrally between the ends thereof coupled to the two branches thus to develop a window defined by the two branches and the frame strip where the prism mounting bed is accommodated.

9. An optical switch according to claim 1, further comprising a prism mounting plate for mechanically coupling between the armature and the prism, the prism mounting plate having a foldable portion thereof arranged to controllably modify its angle over a plane where extended are the moving direction of the armature and the direction across the two polar portions of the iron core.

10. An optical switch according to claim 1, further comprising a prism mounting plate for mechanically coupling between the armature and the prism, the prism mounting plate having a first foldable portion thereof arranged to controllably change its angle over a plane where extended are the moving direction of the armature and the direction across the two polar portions of the iron core and a second foldable portion thereof arranged to controllably change its angle over a plane oriented at a right angle to the direction across the two polar portions of the iron core.

11. An optical switch according to claim 1, further comprising a prism mounting plate for mechanically coupling between the armature and the prism, the prism mounting plate having a first foldable portion thereof arranged to controllably change its angle over a plane where extended are the moving direction of the armature and the direction across the two polar portions of the iron core, a second foldable portion thereof arranged to controllably change its angle over a plane oriented at a right angle to the direction across the two polar portions of the iron core, and a twistable portion thereof arranged to controllably change the twisting angle about a line which extends along the moving direction of the armature.

12. An optical switch according to claim 1, further comprising a coil frame for holding the coil and the iron core and allowing the spring strips to be joined at their retaining ends by corresponding retaining sheets thereto, the coil frame and the iron core fitted by pressing into a holding region of the body.

13. An optical switch according to claim 1, further comprising a lens holder platform provided in the body for holding the lenses, the lens holder platform comprising a pair of lens beds where a set of the lenses are mounted, a side wall jointing between the two lens beds, and a bottom wall joined orthogonal to the side wall and joined to the two lens beds.

14. An optical switch according to claim 13, wherein the iron core is fixedly mounted to the lens holder platform.

\* \* \* \* \*

UNITED STATES PATENT AND TRADEMARK OFFICE
CERTIFICATE OF CORRECTION

PATENT NO.    : 6,829,404 B2
DATED         : December 7, 2004
INVENTOR(S)   : T. Sugiyama et al.

It is certified that error appears in the above-identified patent and that said Letters Patent is hereby corrected as shown below:

Title page,
Item [56], References Cited, OTHER PUBLICATIONS, the following should be included: -- English Language Abstract of E.P.O. Appln. No. 181 657. --.

Signed and Sealed this

Fourth Day of October, 2005

JON W. DUDAS
*Director of the United States Patent and Trademark Office*